(12) United States Patent
McKibben et al.

(10) Patent No.: US 8,195,714 B2
(45) Date of Patent: Jun. 5, 2012

(54) CONTEXT INSTANTIATED APPLICATION PROTOCOL

(75) Inventors: Michael T. McKibben, Columbus, OH (US); Jeffrey R. Lamb, Westerville, PA (US)

(73) Assignee: Leaper Technologies, Inc., Lewis Center, OH (US)

( * ) Notice: Subject to any disclaimer, the term of this patent is extended or adjusted under 35 U.S.C. 154(b) by 594 days.

(21) Appl. No.: 10/731,906

(22) Filed: Dec. 10, 2003

(65) Prior Publication Data

US 2004/0123242 A1    Jun. 24, 2004

Related U.S. Application Data

(60) Provisional application No. 60/432,257, filed on Dec. 11, 2002.

(51) Int. Cl.
*G06F 7/00* (2006.01)
(52) U.S. Cl. ........................................... 707/804
(58) Field of Classification Search .................. 709/202; 715/753; 707/100, 802–805
See application file for complete search history.

(56) References Cited

U.S. PATENT DOCUMENTS

| | | |
|---|---|---|
| 4,714,989 A | 12/1987 | Billings |
| 5,274,806 A | 12/1993 | Hill |
| 5,394,526 A | 2/1995 | Crouse et al. |
| 5,416,917 A | 5/1995 | Adair et al. |
| 5,488,686 A * | 1/1996 | Murphy et al. ............... 715/753 |
| 5,495,607 A | 2/1996 | Pisello et al. |
| 5,530,857 A | 6/1996 | Gimza |
| 5,600,833 A | 2/1997 | Senn et al. |
| 5,664,126 A | 9/1997 | Hirakawa et al. |
| 5,675,784 A | 10/1997 | Maxwell et al. |
| 5,678,042 A | 10/1997 | Pisello et al. |
| 5,680,615 A | 10/1997 | Marlin et al. |
| 5,699,526 A | 12/1997 | Siefert |
| 5,737,495 A | 4/1998 | Adams et al. |
| 5,740,424 A | 4/1998 | Wataya et al. |
| 5,758,351 A | 5/1998 | Gibson et al. |

(Continued)

FOREIGN PATENT DOCUMENTS

WO    WO/00/06220    10/2000

(Continued)

OTHER PUBLICATIONS

Valencia Martin-Wallace. International Preliminary Examination Report. Mar. 17, 2005. 4 pages.

(Continued)

*Primary Examiner* — Angela Lie
(74) *Attorney, Agent, or Firm* — Anthony P. Filomena, Esq.; Taft, Stettinius & Hollister, LLP

(57) ABSTRACT

A system that facilitates the automatic tagging of contextual metadata information to a file as the file is being created. The system facilitates the automatic association of data with a user context, and includes a data operations component that associates with data operations being performed on a data. These data operations include standard data operations such as read, write, delete, move, copy, paste, etc., that are normally associated with data operations. The system further includes a tagging component that facilitates automatic tagging of contextual information to the data when the data is created. That is, when the data is first saved, the tagging operation of the contextual information is performed on the data. Subsequent save operations simply overwrite the existing data in the storage location. Thus, data and applications can be grouped based on the identity of the tag.

35 Claims, 20 Drawing Sheets

U.S. PATENT DOCUMENTS

| | | | |
|---|---|---|---|
| 5,761,661 A | 6/1998 | Coussens et al. | |
| 5,765,155 A | 6/1998 | Nakamura | |
| 5,778,370 A | 7/1998 | Emerson | |
| 5,781,911 A | 7/1998 | Young et al. | |
| 5,787,412 A | 7/1998 | Bosch et al. | |
| 5,806,069 A | 9/1998 | Wakiyama et al. | |
| 5,809,238 A | 9/1998 | Greenblatt et al. | |
| 5,819,084 A | 10/1998 | Shapiro et al. | |
| 5,826,265 A | 10/1998 | Van Huben et al. | |
| 5,835,911 A | 11/1998 | Nakagawa et al. | |
| 5,845,281 A | 12/1998 | Benson et al. | |
| 5,852,810 A | 12/1998 | Sotiroff et al. | |
| 5,859,972 A | 1/1999 | Subramaniam et al. | |
| 5,862,325 A | 1/1999 | Reed et al. | |
| 5,864,875 A | 1/1999 | Van Huben et al. | |
| 5,870,746 A | 2/1999 | Knutson et al. | |
| 5,873,083 A | 2/1999 | Jones et al. | |
| 5,873,103 A | 2/1999 | Trede et al. | |
| 5,887,171 A | 3/1999 | Tada et al. | |
| 5,930,772 A | 7/1999 | Gomyo et al. | |
| 5,930,801 A | 7/1999 | Falkenhainer et al. | |
| 5,933,835 A | 8/1999 | Adams et al. | |
| 5,940,829 A | 8/1999 | Tsuiki et al. | |
| 5,950,201 A | 9/1999 | Van Huben et al. | |
| 5,956,720 A | 9/1999 | Fernandez et al. | |
| 5,956,728 A | 9/1999 | Federighi et al. | |
| 5,956,732 A | 9/1999 | Tsuchida | |
| 5,966,707 A | 10/1999 | Van Huben et al. | |
| 5,978,779 A | 11/1999 | Stein et al. | |
| 5,978,803 A | 11/1999 | Ooe | |
| 5,978,804 A | 11/1999 | Dietzman | |
| 6,026,402 A | 2/2000 | Vossen et al. | |
| 6,026,403 A | 2/2000 | Siefert | |
| 6,026,410 A * | 2/2000 | Allen et al. | 707/104.1 |
| 6,029,161 A | 2/2000 | Lang et al. | |
| 6,029,174 A | 2/2000 | Sprenger et al. | |
| 6,035,297 A | 3/2000 | Van Huben et al. | |
| 6,041,325 A | 3/2000 | Shah et al. | |
| 6,049,799 A | 4/2000 | Mangat et al. | |
| 6,058,395 A | 5/2000 | Buzaglo et al. | |
| 6,064,971 A | 5/2000 | Hartnett et al. | |
| 6,065,009 A | 5/2000 | Leymann et al. | |
| 6,065,014 A | 5/2000 | Wakio et al. | |
| 6,067,549 A | 5/2000 | Smalley et al. | |
| 6,073,109 A | 6/2000 | Flores et al. | |
| 6,088,693 A | 7/2000 | Van Huben et al. | |
| 6,088,706 A | 7/2000 | Hild | |
| 6,088,717 A | 7/2000 | Reed et al. | |
| 6,094,654 A | 7/2000 | Van Huben et al. | |
| 6,094,675 A | 7/2000 | Sunaga et al. | |
| 6,108,646 A | 8/2000 | Mohri et al. | |
| 6,112,196 A | 8/2000 | Zimowski et al. | |
| 6,119,149 A | 9/2000 | Notani | |
| 6,128,626 A | 10/2000 | Beauchesne | |
| 6,134,552 A | 10/2000 | Fritz et al. | |
| 6,154,465 A | 11/2000 | Pickett | |
| 6,157,928 A | 12/2000 | Sprenger et al. | |
| 6,157,929 A | 12/2000 | Zamiska et al. | |
| 6,158,001 A | 12/2000 | Lee et al. | |
| 6,161,146 A | 12/2000 | Kley et al. | |
| 6,185,565 B1 | 2/2001 | Meubus et al. | |
| 6,185,567 B1 | 2/2001 | Ratnaraj et al. | |
| 6,199,081 B1 * | 3/2001 | Meyerzon et al. | 715/513 |
| 6,205,480 B1 | 3/2001 | Broadhurst et al. | |
| 6,216,124 B1 | 4/2001 | Wakio et al. | |
| 6,223,177 B1 | 4/2001 | Tatham et al. | |
| 6,223,219 B1 | 4/2001 | Uniacke et al. | |
| 6,230,312 B1 | 5/2001 | Hunt | |
| 6,233,577 B1 | 5/2001 | Ramasubramani et al. | |
| 6,233,600 B1 | 5/2001 | Salas et al. | |
| 6,236,971 B1 | 5/2001 | Stefik et al. | |
| 6,236,994 B1 | 5/2001 | Swartz et al. | |
| 6,240,415 B1 | 5/2001 | Blumberg | |
| 6,240,416 B1 | 5/2001 | Immon et al. | |
| 6,253,199 B1 | 6/2001 | Wakio et al. | |
| 6,260,040 B1 | 7/2001 | Kauffman et al. | |
| 6,263,330 B1 | 7/2001 | Bessette et al. | |
| 6,263,342 B1 | 7/2001 | Chang et al. | |
| 6,266,669 B1 | 7/2001 | Brodersen et al. | |
| 6,269,380 B1 | 7/2001 | Terry et al. | |
| 6,288,739 B1 | 9/2001 | Hales et al. | |
| 6,289,345 B1 | 9/2001 | Yasue | |
| 6,289,384 B1 | 9/2001 | Whipple et al. | |
| 6,289,385 B1 | 9/2001 | Whipple et al. | |
| 6,289,460 B1 | 9/2001 | Hajmiragha | |
| 6,292,796 B1 | 9/2001 | Drucker et al. | |
| 6,292,830 B1 | 9/2001 | Taylor et al. | |
| 6,298,347 B1 | 10/2001 | Wesley | |
| 6,308,175 B1 | 10/2001 | Lang et al. | |
| 6,308,179 B1 * | 10/2001 | Petersen et al. | 1/1 |
| 6,314,425 B1 | 11/2001 | Serbinis et al. | |
| 6,321,231 B1 | 11/2001 | Jebens et al. | |
| 6,327,594 B1 | 12/2001 | Van Huben et al. | |
| 6,330,569 B1 | 12/2001 | Baisley et al. | |
| 6,332,155 B1 | 12/2001 | Notani | |
| 6,334,146 B1 | 12/2001 | Parasnis et al. | |
| 6,336,099 B1 | 1/2002 | Barnett et al. | |
| 6,339,771 B1 | 1/2002 | Zimowski et al. | |
| 6,341,291 B1 | 1/2002 | Bentley et al. | |
| 6,343,290 B1 | 1/2002 | Cossins et al. | |
| 6,345,288 B1 | 2/2002 | Reed et al. | |
| 6,351,761 B1 | 2/2002 | Cantone et al. | |
| 6,351,762 B1 | 2/2002 | Ludwig et al. | |
| 6,353,819 B1 | 3/2002 | Edwards et al. | |
| 6,353,820 B1 | 3/2002 | Edwards et al. | |
| 6,356,893 B1 | 3/2002 | Itakura et al. | |
| 6,356,909 B1 | 3/2002 | Spencer | |
| 6,363,388 B1 | 3/2002 | Sprenger et al. | |
| 6,370,538 B1 | 4/2002 | Lamping et al. | |
| 6,374,236 B1 | 4/2002 | Chen et al. | |
| 6,374,246 B1 | 4/2002 | Matsuo | |
| 6,381,628 B1 | 4/2002 | Hunt | |
| 6,381,735 B1 | 4/2002 | Hunt | |
| 6,385,624 B1 | 5/2002 | Shinkai | |
| 6,389,426 B1 | 5/2002 | Turnbull et al. | |
| 6,389,434 B1 | 5/2002 | Rivette et al. | |
| 6,389,538 B1 | 5/2002 | Gruse et al. | |
| 6,389,589 B1 | 5/2002 | Mishra et al. | |
| 6,393,421 B1 | 5/2002 | Paglin | |
| 6,397,191 B1 | 5/2002 | Notani et al. | |
| 6,397,192 B1 | 5/2002 | Notani et al. | |
| 6,398,245 B1 | 6/2002 | Gruse et al. | |
| 6,415,289 B1 | 7/2002 | Williams et al. | |
| 6,418,421 B1 | 7/2002 | Hurtado et al. | |
| 6,418,461 B1 | 7/2002 | Barnhouse et al. | |
| 6,418,469 B1 | 7/2002 | Justice et al. | |
| 6,434,403 B1 | 8/2002 | Ausems et al. | |
| 6,434,562 B1 | 8/2002 | Pennywitt et al. | |
| 6,434,682 B1 | 8/2002 | Ashton et al. | |
| 6,434,745 B1 | 8/2002 | Conley et al. | |
| 6,438,233 B1 | 8/2002 | Yoshimune et al. | |
| 6,442,528 B1 | 8/2002 | Notani et al. | |
| 6,446,071 B1 | 9/2002 | Callaway et al. | |
| 6,446,089 B1 | 9/2002 | Brodersen et al. | |
| 6,449,644 B1 | 9/2002 | H.ang..ang.l et al. | |
| 6,477,533 B2 | 11/2002 | Schiff et al. | |
| 6,484,156 B1 | 11/2002 | Gupta et al. | |
| 6,484,177 B1 | 11/2002 | Van Huben et al. | |
| 6,493,702 B1 | 12/2002 | Adar et al. | |
| 6,496,828 B1 | 12/2002 | Cochrane et al. | |
| 6,499,137 B1 | 12/2002 | Hunt | |
| 6,505,196 B2 | 1/2003 | Drucker et al. | |
| 6,516,316 B1 | 2/2003 | Ramasubramani et al. | |
| 6,529,502 B2 | 3/2003 | Sarkissian et al. | |
| 6,532,463 B1 | 3/2003 | Robbins et al. | |
| 6,539,379 B1 | 3/2003 | Vora et al. | |
| 6,539,399 B1 | 3/2003 | Hazama et al. | |
| 6,542,515 B1 | 4/2003 | Kumar et al. | |
| 6,542,932 B1 | 4/2003 | Brinnand et al. | |
| 6,556,995 B1 | 4/2003 | Child et al. | |
| 6,560,639 B1 | 5/2003 | Dan et al. | |
| 6,567,783 B1 | 5/2003 | Notani et al. | |
| 6,567,808 B1 | 5/2003 | Eschelbeck et al. | |
| 6,574,628 B1 | 6/2003 | Kahn et al. | |
| 6,574,629 B1 | 6/2003 | Cooke et al. | |
| 6,574,654 B1 | 6/2003 | Simmons et al. | |
| 6,574,655 B1 | 6/2003 | Libert et al. | |

| | | | | | | |
|---|---|---|---|---|---|---|
| 6,584,466 B1 | 6/2003 | Serbinis et al. | | 6,938,170 B1 | 8/2005 | Kraft et al. |
| 6,587,854 B1 | 7/2003 | Guthrie et al. | | 6,941,307 B2 | 9/2005 | Papanikolaou et al. |
| 6,594,355 B1 | 7/2003 | Deo et al. | | 6,941,313 B2 | 9/2005 | Seliger et al. |
| 6,604,112 B1 | 8/2003 | Taylor | | 6,944,629 B1 | 9/2005 | Shioi et al. |
| 6,612,490 B1 | 9/2003 | Herrendoerfer et al. | | 6,944,662 B2 | 9/2005 | Devine et al. |
| 6,615,213 B1 | 9/2003 | Johnson | | 6,954,757 B2 | 10/2005 | Zargham et al. |
| 6,629,123 B1 | 9/2003 | Hunt | | 6,961,751 B1 | 11/2005 | Bates et al. |
| 6,633,867 B1 | 10/2003 | Kraft et al. | | 6,970,929 B2 | 11/2005 | Bae et al. |
| 6,636,874 B1 | 10/2003 | Douceur et al. | | 6,978,265 B2 | 12/2005 | Schumacher |
| 6,636,889 B1 | 10/2003 | Estrada et al. | | 6,983,311 B1 | 1/2006 | Haitsuka et al. |
| 6,643,641 B1 | 11/2003 | Snyder | | 6,983,463 B1 | 1/2006 | Hunt |
| 6,647,396 B2 | 11/2003 | Parnell et al. | | 6,985,902 B2 | 1/2006 | Wise et al. |
| 6,650,794 B1 | 11/2003 | Aoki | | 6,988,271 B2 | 1/2006 | Hunt |
| 6,654,747 B1 | 11/2003 | Van Huben et al. | | 6,990,491 B2 | 1/2006 | Dutta et al. |
| 6,658,403 B1 | 12/2003 | Kuroda et al. | | 7,000,235 B2 | 2/2006 | Mandal et al. |
| 6,658,415 B1 | 12/2003 | Brown et al. | | 7,010,538 B1 | 3/2006 | Black |
| 6,665,657 B1 | 12/2003 | Dibachi | | 7,016,901 B2 | 3/2006 | Eikenbery |
| 6,665,658 B1 | 12/2003 | DaCosta et al. | | 7,020,653 B2 | 3/2006 | Idicula et al. |
| 6,665,675 B1 | 12/2003 | Mitaru | | 7,020,753 B2 | 3/2006 | Shanahan et al. |
| 6,675,176 B1 | 1/2004 | Shinkai et al. | | 7,024,425 B2 | 4/2006 | Krishnaprasad et al. |
| 6,675,179 B2 | 1/2004 | Morohashi | | 7,028,032 B1 | 4/2006 | Deidrich et al. |
| 6,678,685 B2 | 1/2004 | McGill et al. | | 7,028,079 B2 | 4/2006 | Mastrianni et al. |
| 6,681,227 B1 | 1/2004 | Kojima et al. | | 7,031,968 B2 | 4/2006 | Kremer et al. |
| 6,681,229 B1 | 1/2004 | Cason et al. | | 7,035,837 B2 | 4/2006 | Reulein et al. |
| 6,684,212 B1 | 1/2004 | Day et al. | | 7,035,840 B2 | 4/2006 | Nakos et al. |
| 6,684,438 B2 | 2/2004 | Brodersen et al. | | 7,036,149 B2 | 4/2006 | Sonoda et al. |
| 6,687,693 B2 | 2/2004 | Cereghini et al. | | 7,039,597 B1 | 5/2006 | Notani et al. |
| 6,687,710 B1 | 2/2004 | Dey | | 7,039,626 B2 | 5/2006 | Hirata |
| 6,691,113 B1 | 2/2004 | Harrison et al. | | 7,039,640 B2 | 5/2006 | Miller et al. |
| 6,691,132 B2 | 2/2004 | Walker et al. | | 7,043,490 B2 | 5/2006 | Choy et al. |
| 6,691,151 B1 | 2/2004 | Cheyer et al. | | 7,051,031 B2 | 5/2006 | Schein |
| 6,694,320 B1 | 2/2004 | Ortiz et al. | | 7,051,039 B1 | 5/2006 | Murthy et al. |
| 6,697,811 B2 | 2/2004 | Brodsky | | 7,054,890 B2 | 5/2006 | Musante et al. |
| 6,697,821 B2 | 2/2004 | Ziff et al. | | 7,058,600 B1 | 6/2006 | Combar et al. |
| 6,700,590 B1 * | 3/2004 | DeMesa et al. ............... 715/744 | | 7,058,627 B2 | 6/2006 | Wiesler et al. |
| 6,701,323 B2 | 3/2004 | Sashino et al. | | 7,062,532 B1 | 6/2006 | Sweat et al. |
| 6,714,921 B2 | 3/2004 | Pirolli et al. | | 7,069,242 B1 | 6/2006 | Sheth et al. |
| 6,718,347 B1 | 4/2004 | Wilson | | 7,069,271 B1 | 6/2006 | Fadel et al. |
| 6,718,361 B1 | 4/2004 | Basani et al. | | 7,069,511 B1 | 6/2006 | Maritzen et al. |
| 6,718,366 B2 | 4/2004 | Johnstone et al. | | 7,072,894 B2 | 7/2006 | Loy et al. |
| 6,721,713 B1 | 4/2004 | Guheen et al. | | 7,085,764 B2 | 8/2006 | Bangel et al. |
| 6,721,726 B1 | 4/2004 | Swaminathan et al. | | 7,089,278 B1 | 8/2006 | Churchill et al. |
| 6,721,745 B2 | 4/2004 | Monestere | | 7,092,944 B2 | 8/2006 | Fukuta et al. |
| 6,721,747 B2 | 4/2004 | Lipkin | | 7,092,958 B2 | 8/2006 | Hempstead et al. |
| 6,732,148 B1 | 5/2004 | Estrada et al. | | 7,092,969 B2 | 8/2006 | Meek et al. |
| 6,732,331 B1 | 5/2004 | Alexander | | 7,096,222 B2 | 8/2006 | Kern et al. |
| 6,738,775 B2 | 5/2004 | Asherman | | 7,099,885 B2 | 8/2006 | Hellman et al. |
| 6,745,188 B2 | 6/2004 | Bradburn | | 7,107,268 B1 | 9/2006 | Zawadzki et al. |
| 6,751,613 B1 | 6/2004 | Lee et al. | | 7,111,291 B2 | 9/2006 | Loy et al. |
| 6,754,681 B2 | 6/2004 | Brodersen et al. | | 7,113,883 B1 | 9/2006 | House et al. |
| 6,757,720 B1 | 6/2004 | Weschler | | 7,113,946 B2 | 9/2006 | Cosic |
| 6,760,730 B1 | 7/2004 | Kataoka | | 7,113,999 B2 | 9/2006 | Pestoni et al. |
| 6,772,033 B2 | 8/2004 | Scherer et al. | | 7,118,024 B1 | 10/2006 | Hoshino |
| 6,772,178 B2 | 8/2004 | Mandal et al. | | 7,120,632 B2 | 10/2006 | Helmbrecht et al. |
| 6,775,660 B2 | 8/2004 | Lin et al. | | 7,127,501 B1 | 10/2006 | Beir et al. |
| 6,775,670 B2 | 8/2004 | Bessette | | 7,130,858 B2 | 10/2006 | Ciaramitaro et al. |
| 6,795,831 B2 | 9/2004 | Kadoki et al. | | 7,134,135 B2 | 11/2006 | Cerami et al. |
| 6,807,542 B2 | 10/2004 | Bantz et al. | | 7,136,858 B2 | 11/2006 | Malik et al. |
| 6,820,094 B1 | 11/2004 | Ferguson et al. | | 7,136,912 B2 | 11/2006 | Hotti |
| 6,826,582 B1 | 11/2004 | Chatterjee et al. | | 7,139,761 B2 | 11/2006 | McKibben et al. |
| 6,826,596 B1 | 11/2004 | Suzuki | | 7,146,407 B2 | 12/2006 | McNulty et al. |
| 6,829,612 B2 | 12/2004 | Neulight | | 7,152,080 B2 | 12/2006 | Mikami |
| 6,832,227 B2 | 12/2004 | Seki et al. | | 7,155,426 B2 | 12/2006 | Al-Azzawe |
| 6,834,289 B2 | 12/2004 | Kaneda et al. | | 7,155,461 B2 | 12/2006 | Miyata et al. |
| 6,859,798 B1 | 2/2005 | Bedell et al. | | 7,162,477 B1 | 1/2007 | Mukherjee |
| 6,871,279 B2 | 3/2005 | Sames et al. | | 7,162,537 B1 | 1/2007 | Kathail |
| 6,873,997 B1 | 3/2005 | Majjasie et al. | | 7,165,060 B2 | 1/2007 | Foster et al. |
| 6,874,003 B2 | 3/2005 | Morohashi | | 7,171,411 B1 | 1/2007 | Lewis et al. |
| 6,889,222 B1 | 5/2005 | Zhao | | 7,181,441 B2 | 2/2007 | Mandato et al. |
| 6,889,232 B2 | 5/2005 | Pudipeddi et al. | | 7,181,455 B2 | 2/2007 | Wookey et al. |
| 6,898,598 B2 | 5/2005 | Himmel et al. | | 7,181,507 B1 | 2/2007 | Lavelle et al. |
| 6,898,609 B2 | 5/2005 | Kerwin | | 7,185,317 B2 | 2/2007 | Fish et al. |
| 6,904,432 B2 | 6/2005 | Charlot et al. | | 7,194,470 B2 | 3/2007 | Miyawaki et al. |
| 6,912,522 B2 | 6/2005 | Edgar | | 7,200,638 B2 | 4/2007 | Lake |
| 6,917,962 B1 | 7/2005 | Cannata et al. | | 7,203,927 B2 | 4/2007 | Al-Azzawe et al. |
| 6,922,687 B2 | 7/2005 | Vernon | | 7,211,980 B1 | 5/2007 | Bruemmer et al. |
| 6,922,695 B2 | 7/2005 | Skufca et al. | | 7,224,778 B2 | 5/2007 | Aoki |
| 6,925,462 B2 | 8/2005 | Nishikawa et al. | | 7,225,183 B2 | 5/2007 | Gardner |
| 6,931,397 B1 | 8/2005 | Sundaresan | | 7,231,378 B2 | 6/2007 | Lawson et al. |

| | | |
|---|---|---|
| 7,231,407 B2 | 6/2007 | Brodersen et al. |
| 7,237,002 B1 | 6/2007 | Estrada et al. |
| 7,239,409 B2 | 7/2007 | Parry |
| 7,243,138 B1 | 7/2007 | Majkut et al. |
| 7,246,130 B2 | 7/2007 | Goodwin et al. |
| 7,249,143 B1 | 7/2007 | Bhatia |
| 7,257,581 B1 | 8/2007 | Steele et al. |
| 7,257,767 B1 | 8/2007 | Carden, Jr. |
| 7,260,638 B2 | 8/2007 | Crosbie |
| 7,269,579 B2 | 9/2007 | Lovegren et al. |
| 7,269,604 B2 | 9/2007 | Moore et al. |
| 7,269,625 B1 | 9/2007 | Willhide et al. |
| 7,277,897 B2 | 10/2007 | Bamford et al. |
| 7,346,648 B1 | 3/2008 | Seliger |
| 7,366,990 B2 | 4/2008 | Pitroda |
| 7,437,312 B2 | 10/2008 | Bhatia et al. |
| 2002/0001301 A1 | 1/2002 | Sarkissian et al. |
| 2002/0069366 A1* | 6/2002 | Schoettger .............. 713/201 |
| 2002/0138632 A1* | 9/2002 | Bade et al. ............. 709/229 |
| 2003/0069849 A1 | 4/2003 | Stefik et al. |
| 2003/0208459 A1 | 11/2003 | Shea et al. |
| 2003/0217096 A1* | 11/2003 | McKelvie et al. ......... 709/202 |
| 2004/0117393 A1* | 6/2004 | DeMesa et al. .......... 707/100 |
| 2004/0199623 A1* | 10/2004 | Houri ..................... 709/223 |
| 2005/0058263 A1* | 3/2005 | Frazier .................. 379/88.13 |
| 2005/0086188 A1* | 4/2005 | Hillis et al. ............. 706/50 |
| 2006/0069726 A1 | 3/2006 | McKibben et al. |
| 2006/0123038 A1* | 6/2006 | Fenton et al. ............ 707/101 |
| 2007/0033221 A1* | 2/2007 | Copperman et al. ...... 707/103 R |
| 2007/0220607 A1* | 9/2007 | Sprosts et al. ........... 726/24 |

FOREIGN PATENT DOCUMENTS

WO  PCT/US2008/001576   8/2008

OTHER PUBLICATIONS

International Search Report, PCT/US03/39421, mailed Jun. 21, 2004.
International Written Opinion, PCT/US03/39421, mailed Nov. 15, 2004.
Stephen Voida, et al., "Integrating Virtual and Physical Context to Support Knowledge Workers," IEEE Pervasive Computing, Sep. 2002, pp. 73-79, vol. 1, No. 3.
Dave Banks, et al., "The ePerson Snippet Manager: a Semantic Web Application," Hewlett Packard Publication: HPL-2002-328, Nov. 27, 2002.
Bianco, Matthew, "An Interface for the Visualization and Manipulation of Asynchronous Collaborative Work within the DISCIPLE System," Graduate Thesis, Jan. 2002.
Paul Dourish, et al, Presto: An Experimental Architecture for Fluid Interactive Document Spaces, ACM Transactions on Computer-Human Interaction, vol. 6-2, 133-61, Jun. 30, 1999.
Paul Dourish, et al., Extending Document Management Systems with User-Specific Active Properties, ACM Transactions on Information Systems, vol. 18-2, 140-70, Apr. 30, 2000.
Marlon Pierce, et al., Interoperable Web Services for Computational Portals, Proceedings of the 2002 ACM/IEEE Conference on Supercomputing, Nov. 22, 2002.
John December, The World Wide Web Unleashed (2d ed. 1995), pp. 329-333.

* cited by examiner

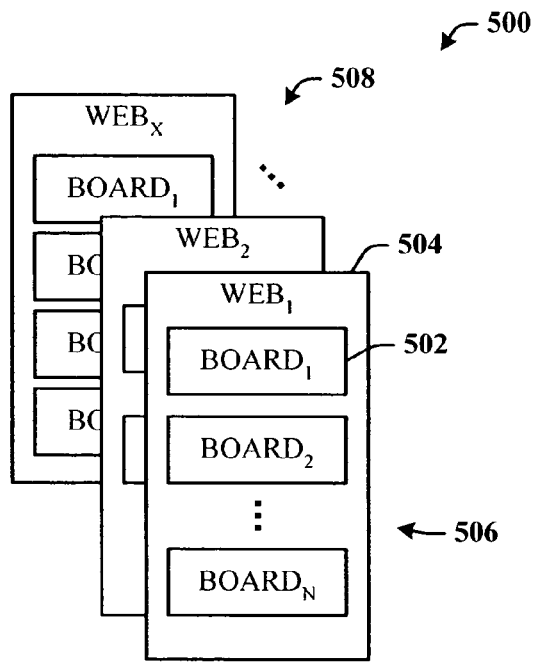
FIG. 5
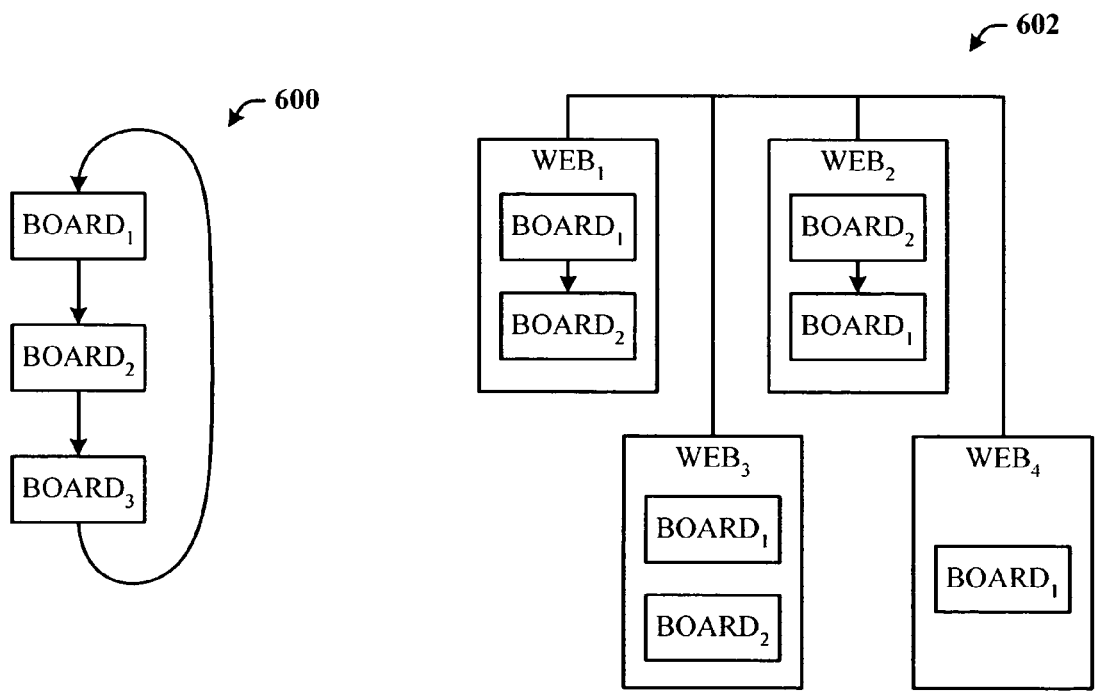
FIG. 6A
FIG. 6B

| WEBS AND BOARDS TABLE ||||
|---|---|---|---|
| USER(S) | WEB(S) | BOARD(S) | BOARD(S) P/C RELATION |
| 1,2,3 | W1 | B11, B12, B14 | B11: B12; B14 |
| 6 | W2 | B23, B25 | NA |
| 9,8 | W1,W3 | B36,B39 | B36:B39;B36 |
| | | | |
| | | | |

CONTEXT INSTANTIATED APPLICATION PROTOCOL

CROSS-REFERENCE TO RELATED APPLICATIONS

This application claims the benefit of U.S. Provisional Patent application Ser. No. 60/432,257 entitled "CONTEXT INSTANTIATED APPLICATION PROTOCOL", filed Dec. 11, 2002; and is related to co-pending U.S. patent application Ser. No. 10/732,744 entitled "DYNAMIC ASSOCIATION OF ELECTRONICALLY STORED INFORMATION WITH ITERATIVE WORKFLOW CHANGES", filed Dec. 10, 2003.

TECHNICAL FIELD

This invention is related to management and storage of electronic information. More particularly, this invention relates to new structures and methods for creating relationships between users, applications, files, and folders.

BACKGROUND OF THE INVENTION

Digital communications presently supply solutions to users in ways that are completely divorced from their business context. A particular item of communication provides little or no inherent understanding of how that communication furthers the purpose and intent of the group or enterprise. In other words, an email (electronic mail) inbox collects email messages about all topics, both business and personal. The email application itself is not discerning about topic, priority, or context beyond perhaps rudimentary "message filters" that will look for certain key words or people, and then place those items in target folders. Generally, the application simply presents a sequential list of messages received. Similarly, a fax machine receives fax pages in sequence. The fax machine is not discerning about topic, priority, or context, and simply outputs fax pages. Once received, it remains the task of the recipient to sort, categorize, and organize these items of communication in ways most meaningful to that person. The organization part of the task generally occurs outside the context of the particular communications tool itself.

Typical methods for organization of communications are limited and fragmented. For example, for an email, the recipient may either leave all the email in the inbox or move it to another electronic folder. For a fax, the recipient is likely to place that received fax in a file folder that is identified by project name or name of recipient. These typical methods of organizing communications are wholly inadequate for a number of reasons. The recipient must do all the work of organization and categorization of the communications rather than the system itself doing that work. Automation of the organization of communications is non-existent. The linkage between business strategy and an individual act of communication, a leadership priority, is non-existent. With respect to categorization, the items themselves rarely apply to only one topic of interest. As such, under current systems, the items would need to be manually stored in multiple locations (either electronic or "brick and mortar" folders). For example, a letter faxed to a sales manager may contain information about contact addresses, market intelligence data, specific product requests, and financial accounting.

Data items often relate to organizational issues for which one or more work groups need access; access that is denied when the recipient "buries" that item in his/her personal filing system, electronic or otherwise. Thus, the sharing of knowledge in this context is prohibitive.

Prior art communications tools do not know the business and/or personal context(s) within which files are created and used. For example, a person may create three files in a word processor, one relating to sales, the second relating to operations, and the third relating to a son's football team. However, the word processor itself has no way of knowing to automatically store those three files in at least three different places. Insofar as security and privacy are concerned, the applications and associated file storage methods are generally insecure, not conforming to a single, dependable security model.

Known software applications create and store files outside of a contextual framework. For example, when a user creates a word processing file using a conventional word processor application, the user typically must select a single folder within which to store that file. The file may be stored in an existing folder or the user may create a new folder to receive the file. This file management method is known as Lightweight Directory Application Protocol (LDAP). LDAP borrowed the physical world paper file management scheme where a machine/application creates files, stores those files in individual folders, and stores those folders in cabinets. Under this scheme, context is completely independent of the application. File context is limited to the decision made by the user about the folder in which the file should be stored. The user decision does not adequately represent or reflect the true context of the file given that the file may contain information that could reasonable be stored in multiple folders.

LDAP systems are suited for smaller one-to-many and many-to-one relationships. For example, an e-mail message to ten recipients is a one-to-many relationship, while ten customers, sending orders to a single vendor exemplifies a many-to-one relationship. In the case of the former, the e-mail is stored in an Outbox, and the ten recipients store the received message in their respective folders, called an Inbox. In the latter case, the ten received orders are placed in an Orders folder for the associated the product.

Conventional systems are designed to allow multiple users to access the same file for collaboration purposes; however, this feature does not change the basic one-to-many and many-to-one storage paradigm. Conventional systems only attempt to optimize it.

Another limitation of LDAP is that little or no information is contained within the file about the user and, the context and circumstances of the user at the time the file was created. The people elements of an organization are simply too multi-dimensional for the limitations of conventional systems. Current processes designed to add context to files, such as a metadata tagging approach, involve having a knowledge officer view files after they have been stored and create metadata tags with additional key words associated with the file for search purposes.

The best that existing technology has done is to respond to niche requirements where automation made sense: telephone switching, voice mail, e-mail, file transfer, paging, and file storage, for example. The trend is toward a convergence of the technologies, but convergence becomes an enormous problem with these legacy systems that are now encumbered by outdated data handling and storage models that are mainframe and/or hierarchical in nature.

Notwithstanding the usefulness of the above-described methods, a need still exists for a communications tool that associates files generated by applications with individuals, groups, and topical context automatically.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, is a system that facilitates the automatic tagging of contextual metadata information to a file as the file is being created. The system facilitates the automatic association of data with a user context. The system includes a data operations component that associates with data operations being performed on a data. These data operations include standard data operations such as read, write, delete, move, copy, paste, etc., that are normally associated with data operations. The system further includes a tagging component that facilitates automatic tagging of contextual information to the data when the data is created. That is, when the data is first saved, the tagging operation of the contextual information is performed on the data. Subsequent save operations simply overwrite the existing data in the storage location. Thus, data and applications can be grouped based on the identity of the tag.

In another aspect, the tagging operation facilitates a data management system that is a unified, horizontal system for communications, organization, information processing, and data storage. The system installs on existing platforms, and is a common workflow layer that is automated with a scalable, relational or object database. The system includes a relational and object database engines that facilitates many-to-many relationships among data elements, in addition to, one-to-many and many-to-many relationships. The data management system includes a novel architecture where the highest contextual assumption is that there exists an entity that consists of one or more users. The data storage model first assumes that files are associated with the user. Thus, data generated by applications is associated with an individual, group of individuals, and topical content, and not simply with a folder, as in traditional systems.

When a user logs in to the system that employs the tool, the user enters into a personal workspace environment. This workspace is called a board, and is associated with a user context. From within this board, the tool makes accessible to the user a suite of applications for creating and manipulating data. Any user operating within any board has access to the suite of applications associated with that board, and can obtain access to any data in any form (e.g., documents and files) created by the applications and to which he or she has permission. A board can have one or more applications associated with it. These application associations on a board can be added or removed from that board at any time. Moreover, thereafter, the user can then move to shared workspaces (or boards), and access the same data or other data.

Data created within the board is immediately associated with the user, the user's permission level, the current workspace, any other desired workspace that the user designates, and the application by employing the automatic contextual tagging architecture. This association is captured in a form of metadata and tagged to the data being created. The metadata automatically captures the context in which the data was created as the data is being created. Additionally, the data content is indexed to facilitate searching for the content in any number of different ways in the future by the user or other users. This tagging process is universal, in that, the data model allows for any binary data (e.g., files), as well as any set of definable data to be accepted into the system. The system is not restricted to processing e-mail, faxes, calendar events, meetings, phone calls, etc., that are included in the bundled system, but can also accommodate whatever data the user chooses to use. The system is also universal insofar as its user interaction can be through a browser that is pervasively employed for use with conventional operating systems.

In that the protocol system supports multiple users, there can be multiple boards. Two or more boards (or workspace environments) can be grouped as a collection of boards, also called a web. Boards can exist in any number of different webs. The association of webs and boards is stored in a table. As a user creates a context, or moves from one context to at least one other context, the data created and applications used previously by the user automatically follows the user to the next context. The change in user context is captured dynamically in accordance with the present invention. All files and groups of files can be associated with any other file in the system, allowing a system user the flexibility in determining dynamic associations.

In addition to the macro view provided by webs and boards, the user can also create the more familiar hierarchical folders within any board. These are virtual folders, and nothing is physically stored in these folders.

In another aspect of the present invention, the protocol system promotes the seamless facilitation, collection, compilation, and distribution of data.

In yet another aspect of the present invention, the protocol system provides links to enterprise leadership priorities.

In still another aspect of the present invention, the protocol system facilitates communications tasks while simultaneously reminding the user of his/her individual work priorities.

In another aspect thereof, the protocol system automatically stores contextual information relating to an item of communication and utilizes that contextual information in performance of communication tasks.

In yet another aspect thereof, the protocol system operates within a data management system that integrates two or more different applications such as (including but not limited to) telephony, unified messaging, decision support, document management, portals, chat, collaboration, search, vote, relationship management, calendar, personal information management, video, profiling, directory management, executive information systems, dashboards, cockpits, tasking, meeting, conferencing, etc., into a common application.

In another aspect thereof, the protocol system provides a structure for defining relationships between complex collections of data.

In still another aspect of the present invention, the protocol system provides a process for automating workflow between multiple entities.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 5 illustrates a system employing a board and a web in accordance with the contextual tagging architecture of the present invention.

FIG. 6A illustrates a diagram of board relationships.

FIG. 6B illustrates board/web relationship diagram.

DETAILED DESCRIPTION OF THE INVENTION

Figure 1:
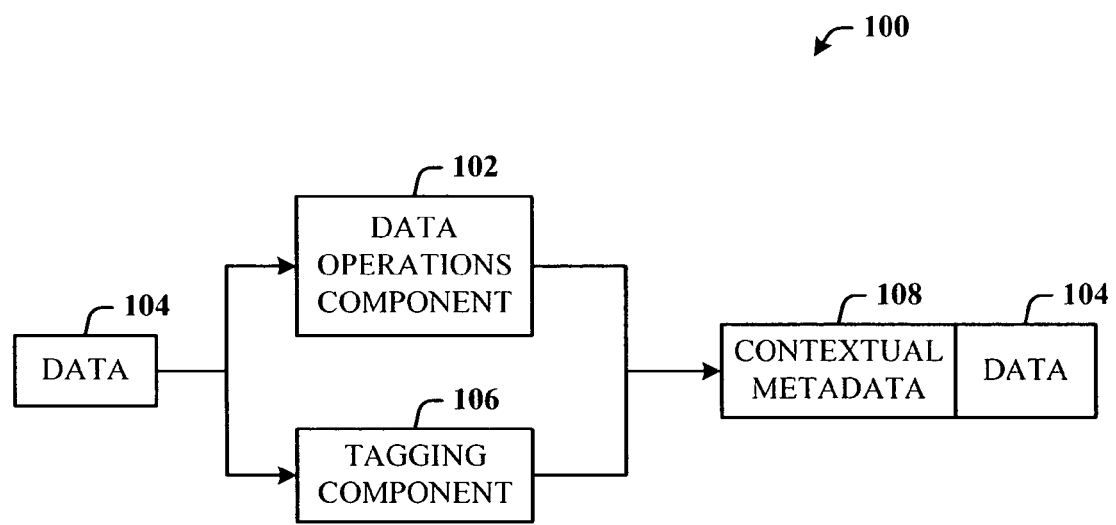
FIG. 1 illustrated a block diagram of a system that facilitates the automatic association of data with a user context, in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Referring now to FIG. 1, there is illustrated a block diagram of a system 100 that facilitates the automatic association of data with a user context, in accordance with the present invention. The system 100 includes a data operations component 102 that associates with data operations being performed on a data 104. These data operations include standard data operations such as read, write, delete, move, copy, paste, etc., that are normally associated with data operations. The system 100 further includes a tagging component 106 that facilitates automatic tagging of contextual information 108 to the data 104 when the data 104 is created. Thereafter, if a subsequent data operation is performed on the data 104, the contextual metadata 108 is updated. That is, when the data 104 is first saved (e.g., a write operation), the tagging operation of the contextual information 108 is performed on the data. A subsequent data operation, e.g., a read operation, causes updating of the contextual metadata 108 that reflects that that particular data operation has been noted and recorded. However, the data content itself is not updated, since the data operation did not affect the content, but only the contextual information.

Note that in accordance with the present invention, there is only a single data storage location, and not multiple storage locations of the same data for the respective users. For example, in traditional systems, if an e-mail with attachment is sent to ten different users, the attached file will be stored in ten different locations, whether locally or on a network server. The disclosed architecture stores the saved data in one location and generates a pointer (or link) to that location. The location is already known such that a "Save As" operation, normally associated with traditional systems, is no longer required. The system automatically stores the data in a single storage location, and further in association with the user context in which it was created. The pointer is then supplied to each user that requires it and each other user context to which it is desired to be associated.

The tagging operation occurs independent of the application and type of data being processed. For example, the tagging process occurs with text files, spreadsheet files, audio files, video files, programming language files, and image files, to name just a few. Thus, the tagging operation is application independent, and independent of data type.

In accordance with the present invention, the tagging operation occurs in association with a user context. This is described in greater detail hereinbelow. When the user logs in to the system, he or she enters their workspace that consists of an aggregated view of all workspaces to which they have some level of permission access. From this view they can access an individual user context, which context is called a board. Any further data operation activities in that user context are stored as an association with that user context. When the file is created, a unique hash code is assigned to the file.

The hash code is then referenced to access the stored data, instead of by a filename, as in conventional systems.

As will be described in greater detail hereinbelow, two or more boards can be grouped as collections (also denoted as webs). The boards of a web can have interrelationships. The relationship of the board to a web and other boards is captured in the form of a webslice. A file created on a board receives a default webslice that includes at least the following: a web ID, starting board ID, and traversal relationship of just the boards with which the user is associated. The webslice is the link to the stored data (i.e., the data content), and is employed for assigning the data to more than one board.

Each board is associated with at least one application tool. The tool generates a pointer (or webslice) of contextual information for each user assigned to that board. Additionally, each web that has that board as a member, includes the link to that data content location.

As indicated previously, each user assigned to the board also has the webslice (or link) assigned that identifies the location of the data content. The link relationship of the user to the content is unique to the user, and carries information of the data operations performed by the user on that data. For example, where each of ten users has received the link to the data, each of the users can perform different operations on the data. A first user may simply read the data, which data read operation will be captured and stored via that first user's link data. Moreover, a second user may have simply acknowledged receipt of the data by reading it. The system can also log this data operation. Thus, each user associated with the board has an assigned updatable link that defines data operations performed by the user related to the data. Additionally, the content itself knows what board(s), via the webslice, that it belongs to, because the content only has one such relationship, and that relationship is modifiable.

In addition to having the data associated with a user board, the user can also associate it to one or more of interrelated boards of another web. If this is done, the system creates a number of new user relationships for all the users of the related boards. This is an optimization technique for read performance, since, if the user wants to see the content for a given board, they go directly to the board, to the tool, and to their own collection, with the pointers already presented and waiting for selection. Thus, there is no query required to search for the information.

The system 100 is suitably designed to automatically tag contextual data to data being created from one or more applications that perform data operations related to at least one of (including but not limited to) telephony, unified messaging, decision support, document management, portals, chat, collaboration, search, vote, relationship management, calendar, personal information management, profiling, video, directory management, executive information systems, dashboards, cockpits, tasking, meeting and, web and video conferencing.

It is to be appreciated that the contextual information can be tagged to the data before that data is saved. This can occur as an automatic backup operation during an abnormal system failure, such that when the data has not been previously saved, and the system senses that the system or one of its components (e.g., a tool of the board) is failing, the system can automatically store the data, and tag the context information to the stored data before shutdown.

The format of the webslice (also called the link or pointer) is described generally hereinbelow with respect to the description of FIG. 6B. A more detailed implementation includes at least a web ID, a starting board ID, and "transversal" data (i.e., a mapping to the data), in the following format:

webslice (target board)=<webID; starting board ID; transversal data; parameter1; paramter2; . . . ; parameterN; data location>.

The additional parameters; parameter1, parameter2, . . . , parameterN, include, for example, a user ID of a user in the context (or board), and any of the number of data operations (i.e., read, write, acknowledge, etc.). Thus, when the user performs a read operation, the associated read parameter, e.g., parameter2, is updated, and stored. The data location information can be the hash code of the data location, although, this is not required to be the hash code.

Figure 2:
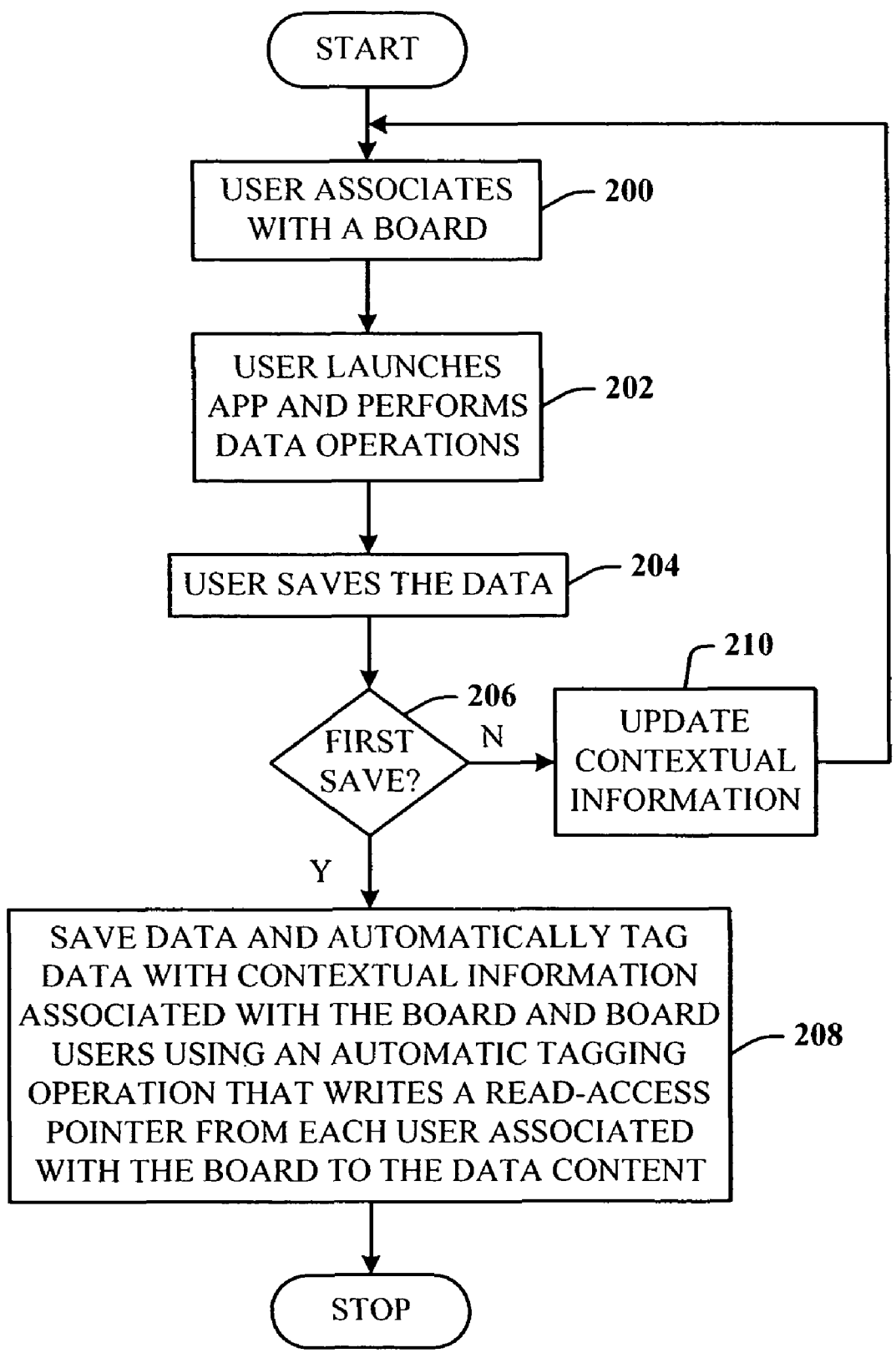
FIG. 2 illustrates a flow chart of an automatic contextual tagging process of the present invention.

Referring now to FIG. 2, there is illustrated a flow chart of an automatic contextual tagging process of the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, a user associates with a user context or board. This can be accomplished by logging in to the data management system that is described in greater detail hereinbelow. At 202, the user launches an application while in the user context and performs one or more data operations on data. At 204, the data is then saved. At 206, it is determined if this it the first time that the data has been saved. If YES, flow is to 208, where the data is saved, and automatically tagged with contextual information associated with the user context, and the context users, using an automatic tagging operation whereby a read-access pointer is written from each user of the board to the stored content. The process then reaches a Stop block. If, however, the data has been previously saved, the tagging operation is not required. Thus, the only thing that needs to be done is to update the contextual information to reflect what data operation the user has performed, e.g., a read operation. Flow is then back to the input of 200 for the next user login. Note, however, that flow can be back to the input of 202 where the user launches a different application to perform data operations on a different stored data element, or new data that is being created.

Figure 3:
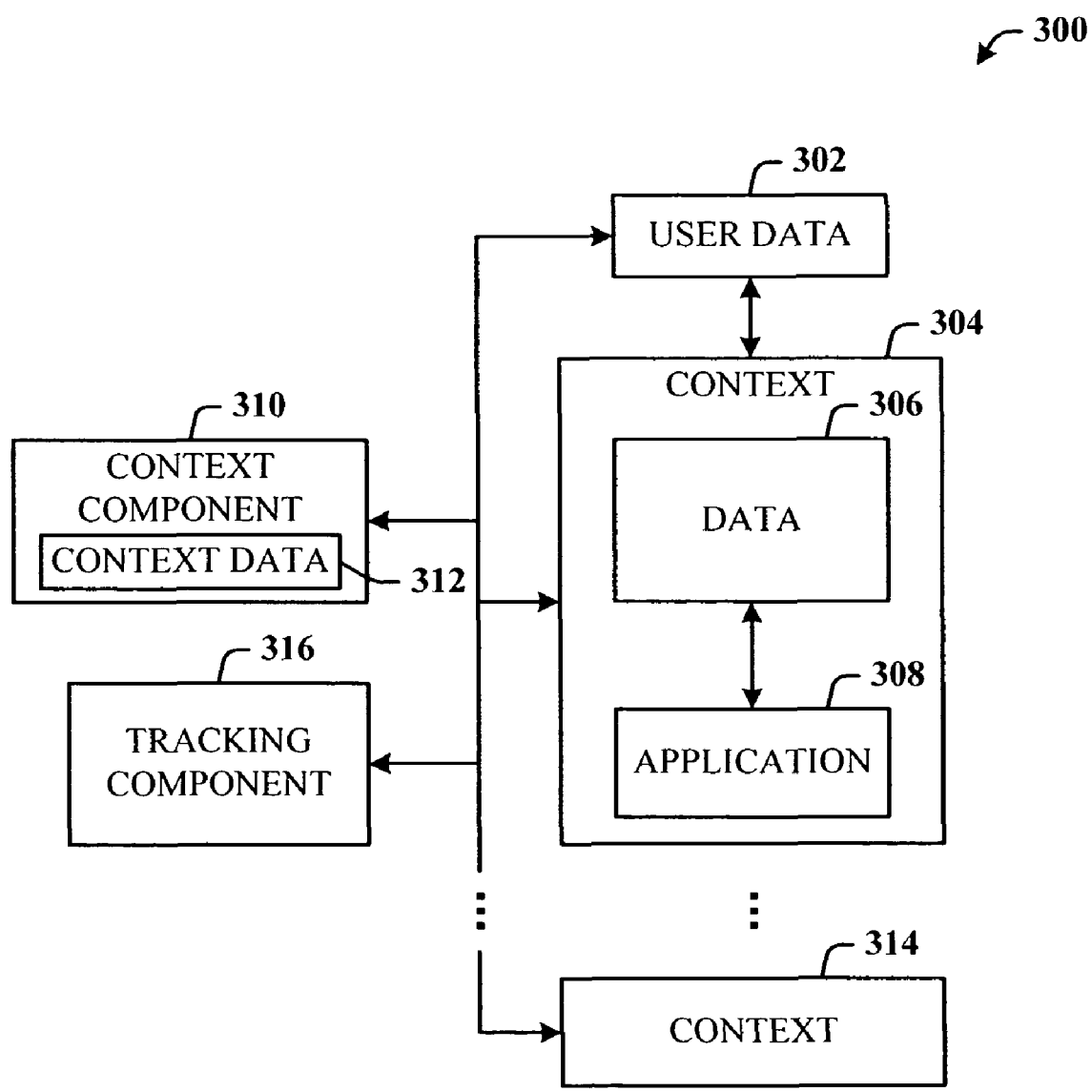
FIG. 3 illustrates a block diagram of a system that employs the automatic contextual tagging architecture of the present invention to facilitate the management of data.

Referring now to FIG. 3, there is illustrated a block diagram of a system 300 that employs the automatic contextual tagging architecture of the present invention to facilitate the management of data. The data management tool includes a novel architecture where the highest contextual assumption is that there exists an entity that consists of one or more users. The data management and storage model first assumes that data is associated with the user. Thus, data generated by an application employed by the user is associated with the user, groups of users, and topical content; and not simply with a folder, as in traditional systems.

In support thereof, when a user logs-in to the system 300, user data 302 is generated and associated with at least the user and the login process. The user automatically enters into a user workspace or a first context 304 (also denoted CONTEXT$_1$) or environment. This environment can be a default user workspace, or workspace environment predesignated by the user or an administrator after login, for example. After login, the user can perform data operations (e.g., create and manipulate) on a data 306 (similar to data 104) in any number of ways, including, but not limited to, reading, editing, copying, moving, acknowledging, and deleting the data. Such data operations can be performed using at least one application 308. For example, where the data 306 is text data, a text editing or word processing application can be employed. Many different text editor and/or word processing applications exist that can be used to create, view, edit, copy, and move the data 306, to name just a few of the operations. Where the data 306 is program code, the application 308 is one that is suitable for providing user access and interaction therewith. Where the data 306 is a voice file, the application 308 can be an application suitable for playing the voice file. This all occurs in association with the first context 304.

The system 300 also includes a context component 310 in association with the first context 304 to monitor and generate context data 312 associated with data operations of the user in the first context 304. The context data 312 includes at least data representative of the user (e.g., some or all of the user data 302), data representative of the first context 304, data representative of the data 306, and data representative of the application 308. The context data 312 can be stored in the form of a table (or any other suitable data structure) for access and processing, and at any location, as desired.

The system 300 can include a plurality of the contexts, denoted as $CONTEXT_1, \ldots, CONTEXT_N$. Thus, in addition to the first context 304, there is at least a second context 314 with which the context component 310 is associated. This is because the user of the first context 304 can move to the second context 314, and perform many different data operations therein which will then be associated with that user in that second context 314. The data operations performed in the second context 314 are also associated with the user and stored automatically. Such user activities and data operations in the one or more contexts of the system 300 and movement of the user between contexts are tracked using a tracking component 316. Thus, data generated by applications is associated with an individual, group of individuals, and topical content; and not simply with a folder, as in traditional systems.

Figure 4:
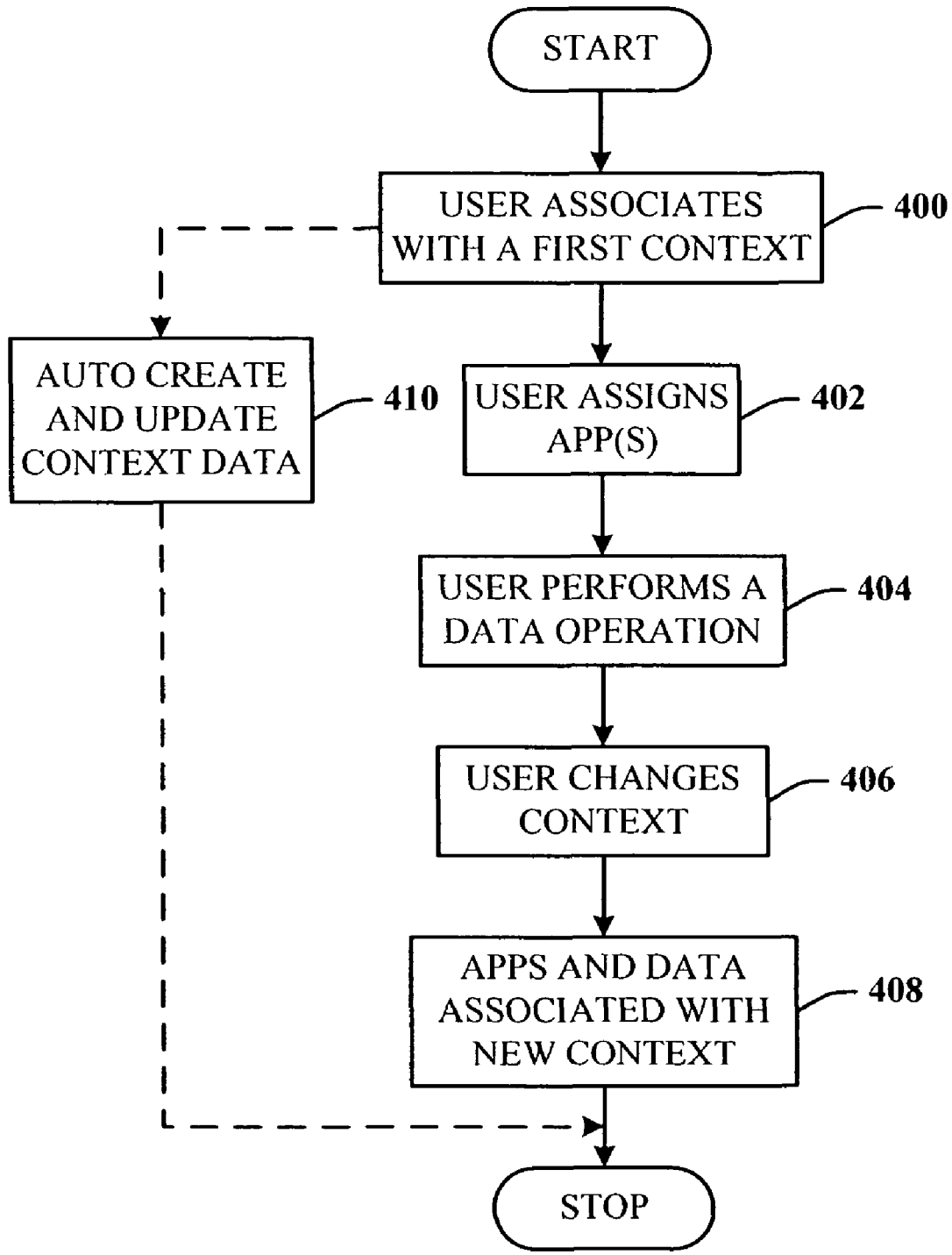
FIG. 4 illustrates a flow chart of a data management process that employs the automatic contextual tagging methodology of the present invention.

Referring now to FIG. 4, there is illustrated a flow chart of a data management process that employs the automatic contextual tagging methodology of the present invention. At 400, a user is associated with a first context. This can occur by the user logging in to a system and automatically entering a user workspace, which workspace is associated with the first context. At 402, the user assigns applications for use in the user context. This can occur explicitly by the user manually selecting the application(s) for association with the context, or implicitly by the user launching an application and performing data operations within the context. At 404, the user performs a data operation. At 406, the user changes context from the first context to a second context. At 408, the data and application(s) are then automatically associated with the second context. The process then reaches a Stop block.

As the user performs data operations in the first and second contexts, the system automatically creates and updates context data, as indicated at 410. This occurs transparently to the user, as indicated by the dashed line.

Referring now to FIG. 5, there is illustrated a system 500 employing a board 502 and a web 504 in accordance with the contextual tagging architecture of the present invention. In the past, intuitive, dynamic, and changeable workflow processes have proved to be too dynamic and expensive for automation. Boards and webs are used to automate workflow processes and define relationships between data and applications. As users create and change their contexts, the data (e.g., files) and applications automatically follow, the shifts in context being captured dynamically in the context data. As used herein, a "board" is defined as a collection of data and application functionality related to a user-defined topic. For example, a user-defined topic may be a department of a company or a project that involves the company. In the case of a project, the board preferably includes all of the data relating to that project including email, tasks, calendar events, ideas, discussions, meetings, phone calls, files, contact records, people, etc. Data and applications may be grouped in a board based on the identity of the tag. As used herein, the term "web" refers to a collection of interrelated boards.

As implemented, the web 504 of the system 500 can include a plurality 506 of the boards 502 (also denoted as $BOARD_1, BOARD_2, \ldots, BOARD_N$). The plurality of boards 506 can each be associated with a single user, one with a single user, and others with multiples users, including or not including the user. The system 500 can also employ a plurality of webs 508 (also denoted $WEB_1, WEB_2, \ldots, WEB_X$). The many boards 506 can be grouped in different combinations as webs. For example, $BOARD_1$ and $BOARD_2$ can be grouped as $WEB_2$. Thus, where $WEB_1$ includes three boards all related to a single project, the boards 506 can include finance, accounting, and resources, for example.

Referring now to FIG. 6A, there is illustrated a diagram 600 of board relationships. Boards in a web may have, for example, a parent-child relationship, although this is not required. A given board can have more than one parent and more than one child. A board cannot be its own child or its own parent. However, boards can have various relationships to each other. For example, a board may be part of a circular relationship of any complexity. Illustrated herein, a first board, $BOARD_1$, is parent to a second board, $BOARD_2$. The second board, $BOARD_2$, is parent to a third board, $BOARD_3$, and $BOARD_3$ is parent to the first board, $BOARD_1$.

Referring now to FIG. 6B, there is illustrated board/web relationship diagram 602. Boards can exist in any number of webs. Many boards will exist in more than one web. The web represents a certain view of the relationships among boards. That is, the view can be hierarchical, or the view can be in the form of a work-flow. Additionally, the relationship between two boards on one web is independent of the relationship between those same two boards on other webs. As shown, in a first web, $WEB_1$, $BOARD_1$ is a parent to $BOARD_2$. Yet, in a second web, $WEB_2$, $BOARD_1$ is a child to $BOARD_2$. In a third web, $WEB_3$, $BOARD_1$ and $BOARD_2$ have no relationship, but exist independent of one another. In a fourth web, $WEB_4$, $BOARD_1$ exists, but $BOARD_2$ does not. These are but a few examples of the web/board relationships that can exist in accordance with the present invention.

Webs may be used to maintain the location of content within a complex and changing set of boards and support automation of a workflow process. One example of automation of a changing workflow process can be illustrated where the workflow process to be automated initially is represented by A→B→C, and ultimately changed to A→B/C→D. Three different groups of people are assigned to each item, where the resulting distribution is A(1,2,3)+B(4,5,6)+C(7,8,9).

In the known LDAP environment, it is necessary for the automation sequence to predetermine how work data flows from A to B and C. Then the automation module for inputs to D must be spelled out and rewritten to consolidate the split inputs from B and C. As such, the automation support for this workflow change will always lag behind the ability of the people involved to start working with the new workflow assumptions.

In contrast, and in accordance with the present invention, webs and boards are the context for applications, files, and folders. Hence, the workflow process may be readily reorganized by making a change to one or more of the webs and boards. By simply adding the board D and rearranging some of the relationships of A, B, and C, the workflow is quickly reorganized and implemented.

The disclosed system has associated therewith a routing algorithm, referred to herein as a "webslice." A webslice is a relationship rule that defines a relationship between a web and one or more boards of that web. If the web changes (e.g., a board is added), and meets the criteria of the rule, the content will be on the new board as well. For example, the rule can include a web ID, a starting board ID, and "transversal" data (i.e., the relationship rule), in the following format:

webslice(target board)=<webID; starting board ID; transversal data>.

Thus, if a system includes two webs, W1 and W2, where web W1 includes five boards: A (the starting board), B, C, D, and E, with each subsequent board a child to the previous board (i.e., B is child of A, C is child of B, etc.), the webslice data "slicing" to board E will be similar to the following:

webslice(board E)=<W1; board A; A→B→C→D→E>.

It is to be appreciated that where a child board has at least two parent boards, the webslice data can include at least two paths. For example, consider that A is the parent to both B and C, with B and C the parents to D. A webslice to D can be obtained in one of two ways:

webslice(board D)=<W1; board A; A→B→D>, or webslice(board D)=<W1; board A; A→C→D>.

Moreover, since the webslice to a given board of a web can take at least two different paths, one path can be longer than the other to the desired board. Consider that A is the parent to both B and C, with B the parent to D, and C the parent to E, and E the parent to D. A webslice to D can be obtained in one of two ways:

webslice(board D)=<W1; board A; A→B→D>, or webslice(board D)=<W1; board A; A→C→E→D>.

These examples are only but a few of the relationships that can be extracted using a webslice. The webslice can also take the forms of the following: "Just the board I started from" (a default); "All child boards"; "All sibling boards"; and, "All descendant boards", for example.

Thus, by using at least these three basic entities for the webslice (i.e., the web ID, the starting board ID, and the transversal data), the boards associated with a given content can be ascertained. Since content is associated with context, and the board is used in part to define the context, the system knows the content associations whereupon a change of web structure, the system knows with which board(s) the content is associated, both before and after the structure change. In keeping with one aspect of the invention, the location of the content may be determined dynamically at runtime using the webslice. Alternatively, the associated location of content may be determined by detecting changes in structure, detecting the temporary location of the content on the boards in the routing algorithm before and after the change, and adjusting the location of the affected content as part of the change in structure. Of course, the webslice data is not limited to the three aspects indicated hereinabove, but may include further information, such as at least one application ID and user ID (that uniquely identifies the creator of the content), for example.

Data created while the user is in the board is immediately associated with the user, the current workspace, any other desired workspace that the user designates, and the application. This association is captured in a form of the contextual metadata and tagged to the data at the time of its creation. The metadata automatically captures the context in which the data was created as the data is being created. Additionally, the data content is indexed to facilitate searching for the content in number of different ways in the future by the user or other users. This tagging process is universal, in that, the data model allows for any binary data (e.g., files), as well as any set of definable data to be accepted into the system. The system is not restricted to processing e-mail, faxes, calendar events, meetings, phone calls, etc., that are included in the bundled system, but can also accommodate whatever data the user chooses to define. The system is also universal insofar as it user interaction can be through a browser that is pervasively employed for use with conventional operating systems.

Figure 7:
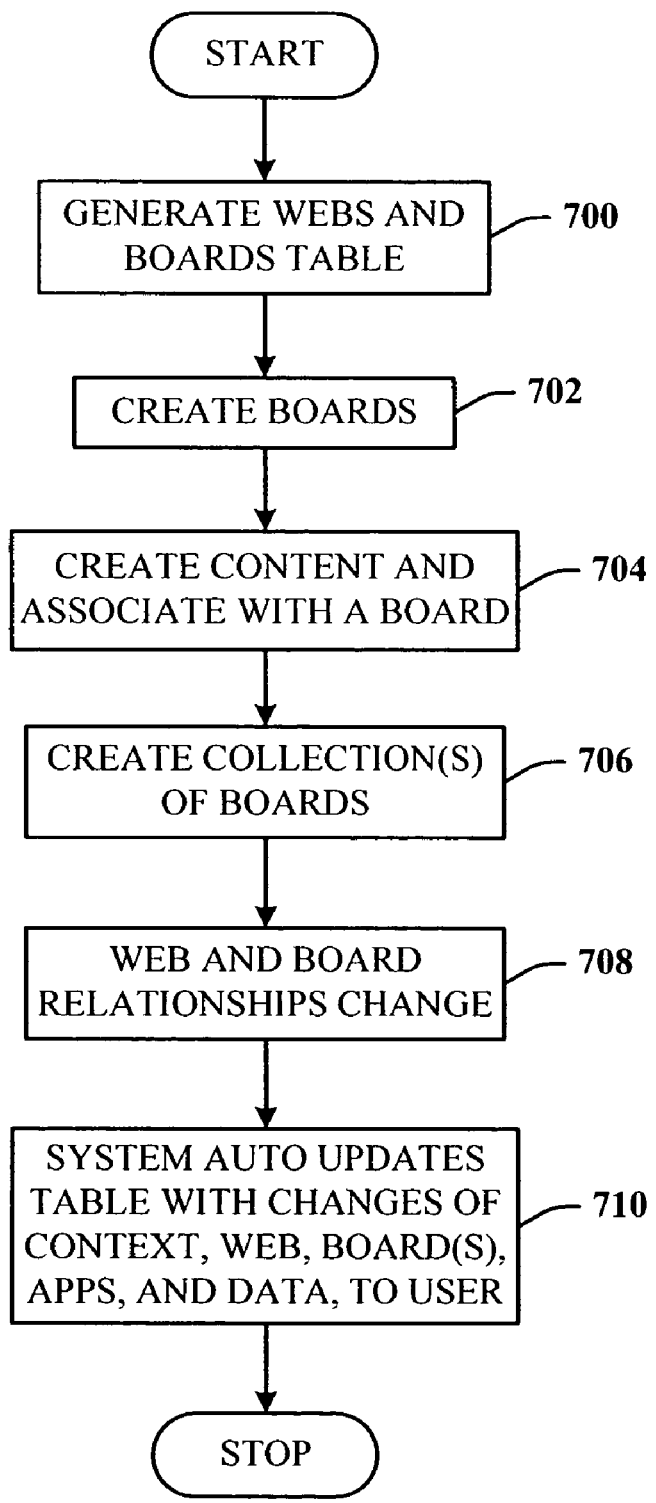
FIG. 7 illustrates a flow chart of a process for board and web generation.

Referring now to FIG. 7, there is illustrated a flow chart of a process for board and web generation. At 700, a webs-and-boards table is created to track the relationship of said aspects. At 702, a user creates a board. This can be via an administrator initially configuring a person user workspace, or thereafter, a user creating another workspace, for example, a shared workspace. At 704, the user performs data operations while in the board. The data and applications employed to operate on the data are then included as content associated with the user in this particular context. Given that there can be multiple users, there can be a corresponding one or more webs associated with the one or more users. A BOARD(S) column lists the number of boards, select numbers of the boards can now be grouped in collections or webs, as indicated at 706, to facilitate workflow, for example. For any number of reasons, the web and board relationships can be changed, as indicated at 708. At 710, the webs-and-boards table is automatically updated as these changes occur. The process then reaches a Stop block.

Figures 8, 9:
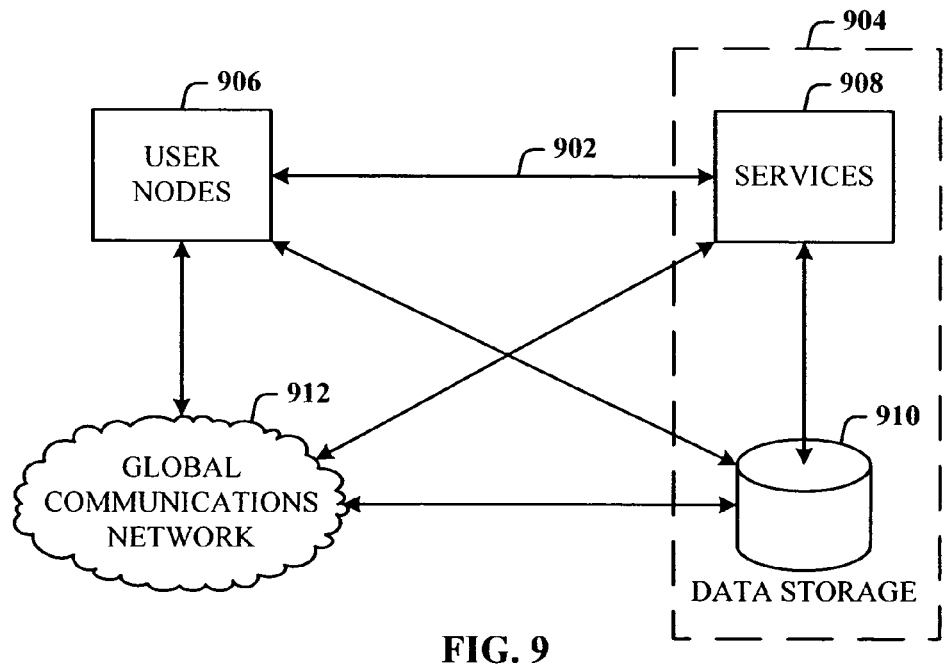
FIG. 8 illustrates a sample webs-and-boards table.
FIG. 9 illustrates a block diagram of system that uses the tagging architecture in accordance with the present invention.

Referring now to FIG. 8, there is illustrated a sample webs-and-boards table 800 used in accordance with the data management tool. The table 800 includes a user information column related to a number of users (1-3 and 6-8), under the heading of USER(S). This is because the novel invention first begins by associating all aspects with the user. The table 800 also includes a WEB(S) column that associates one or more webs (W1, W2, and W3) with the one or more users. A BOARD(S) column lists the lists the boards (e.g., B11, B12, and B14) with a given web. Here the users 1, 2 and 3 are associated with a web W1 that comprises a collection boards B11, B12, and B14 (where the first digit is the associated web number, and the second digit is the board number). The table 800 also includes a parent/child relationships column (denoted as BOARD(S) P/C RELATION). Here, board B11 is the parent, and board B12 is a child, and a parent to board B14. The table 800 is not limited to the columns provided, but can include more information, as desired.

Referring now to FIG. 9, there is illustrated a block diagram of system 900 that uses the tagging architecture in accordance with the present invention. Generally, the system 900 includes an internal network 902 on which is disposed a services system 904 and one or more users 906 seeking use of the services system 904. The services system 904 further includes a services component 908 and an associated data storage system 910 for storing data and programs. The services system 904 includes the data management tool of the present invention.

A user at one of the user nodes 906 can access the services system 904 via a browser over a wired/wireless communication link. Given that a browser is a principal means for access, the user node can be any type of computing device and operating system that supports a browser, whether the browser is a full-blown program typically used on a desktop computing system, or a modified or slimmed down browser interface employed in a portable computing device, e.g., a personal data assistant (PDA), wireless computing tablet, and cellular/digital telephone. As illustrated, the user nodes 906 also have direct access to the data storage system 910.

The user nodes 906 can also access a global communications network 912, e.g., the Internet, using conventional communication means, thereby providing a second path for accessing the services system 904, that further facilitates direct access to the services 908 and/or the storage system 910. This second path is most important, since a user can access the system 904 from essentially anywhere.

The services system 904 can be utilized internal to a corporate environment operating on, for example, an intranet, and providing such services only to corporate users. In another implementation, the system 904 can be disposed external to the corporate environment such that the company subscribes to the system services via a vendor.

Figure 10:
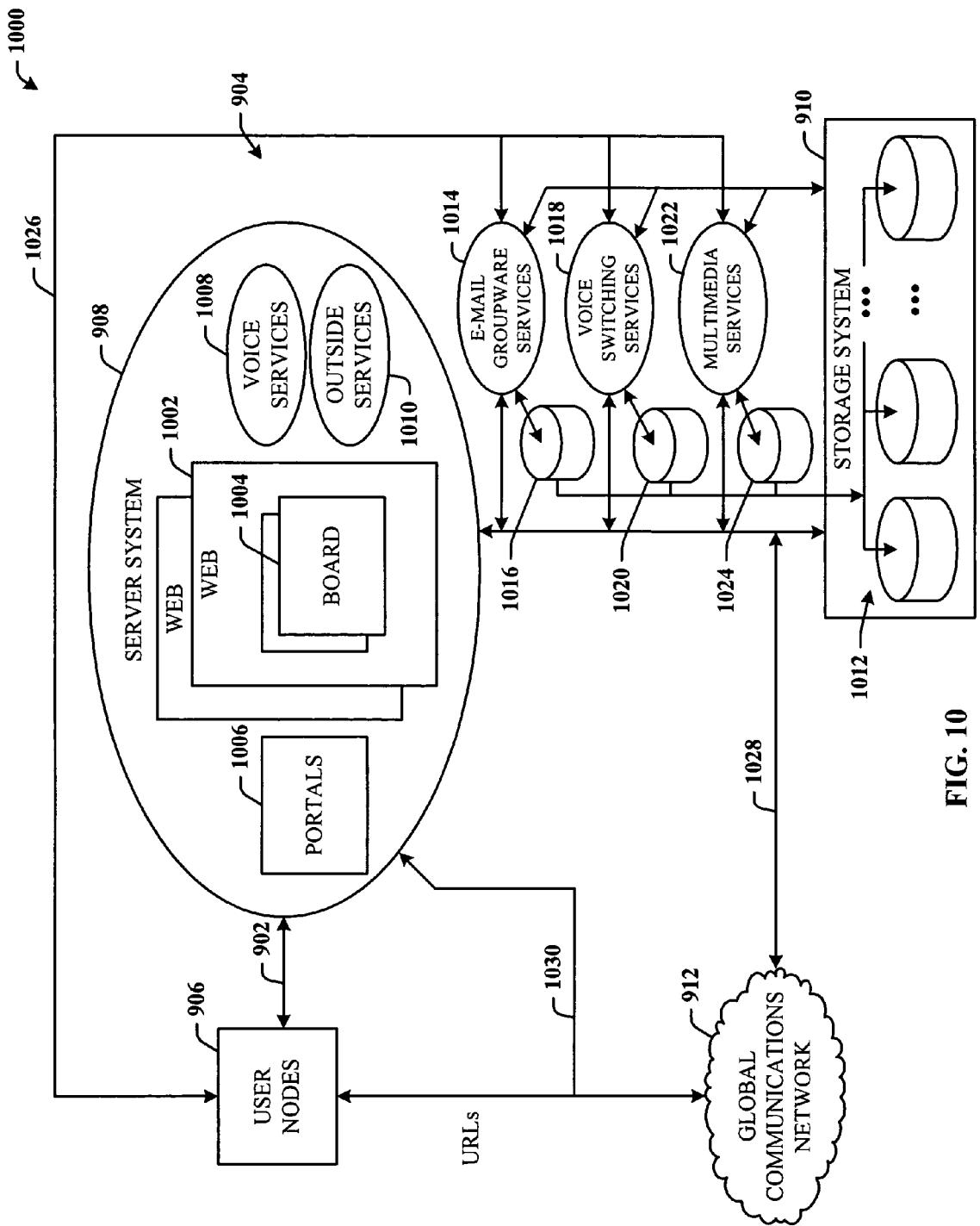
FIG. 10 illustrates a more detailed block diagram of a system that employs the contextual tagging system of the present invention.

Referring now to FIG. 10, there is illustrated a more detailed block diagram of a system 1000 that employs the contextual tagging system of the present invention. The system 1000 includes the internal network 902 on which is disposed the services system 904 and the one or more users 906 seeking use of the services 908 provided thereby. The services 908 facilitate the use of the data management tool, which employs one or more webs 1002 and boards 1004. The tool further provides portal services 1006 for accessing the services from various internal and external network locations using the TCP/IP suite of protocols. Other services provided include, but are not limited to voice services 1008 and outside services 1010. Outside services 1010 facilitate including non-employees and the use of third-party applications in specific projects in the system by providing various levels of access to any number of data locations and services. Read/write permissions can be granularized to the file level, if desired.

The data storage system 910 includes a number of storage methodologies 1012 for handling and processing data. For example, one methodology enables large numbers of users to organize files and documents around many projects simultaneously. Data of any kind and size can be uploaded to a common shared workspace or board. Varying levels of access can be provided to the uploaded data. Other methodologies are associated with storing the data, archiving the data, data warehousing, library data, and an idea registry for tracking that aspect of the companies intellectual capital. The storage system 910 facilitates the storage and access of metadata libraries that link hierarchical and non-hierarchical LDAP folders.

As indicated hereinabove, the management tool operates seamlessly with existing computing system applications, and existing system services. For example, the conventional system services can include at least the following: e-mail, collaboration and groupware services 1014 having an associated e-mail, collaboration and groupware storage system 1016; voice switching services 1018 (e.g., telephone and paging functions) having an associated voice data storage system 1020; and multimedia services 1022 having an associated multimedia storage system 1024. The storage system 1016, 1020, and 1024 can connect to the storage system 910 to facilitate data transfer and storage in accordance with the various methodologies of the storage system 910.

A user of the users node 906 can also access the e-mail/collaboration/groupware services 1014, voice switching services 1018, and multimedia services 1022 indirectly through the services system 904 using a multi-user data manipulation engine, e.g., OLAP (On-Line Analytical Processing). Alternatively, the user can access these services 1014, 1018, and 1022 directly over the network 902, but shown separately as a communication link 1026, and through the services 908 without using the multi-user engine.

The user can also access the services 904, other services 1014, 1018, and 1022, and data storage system 910 over the global communications network 912 via a link 1028. This is facilitated through the user browser by directing the browser to a website using a URL (Uniform Resource Locator) or through an alternative link 1030.

The management tool is browser-based and incorporates a strong-encryption scheme (e.g., using 128-bit SSL (secure socket layer) protocol). This means that data transmitted between the user computer and the services server is substantially secure. Furthermore, data shall not be cached, which means that there is no information footprint left on the user computer after the user logs off. The user can access data securely from virtually any network node using any type of browser. The data is stored encrypted on the storage system 910.

Figure 11:
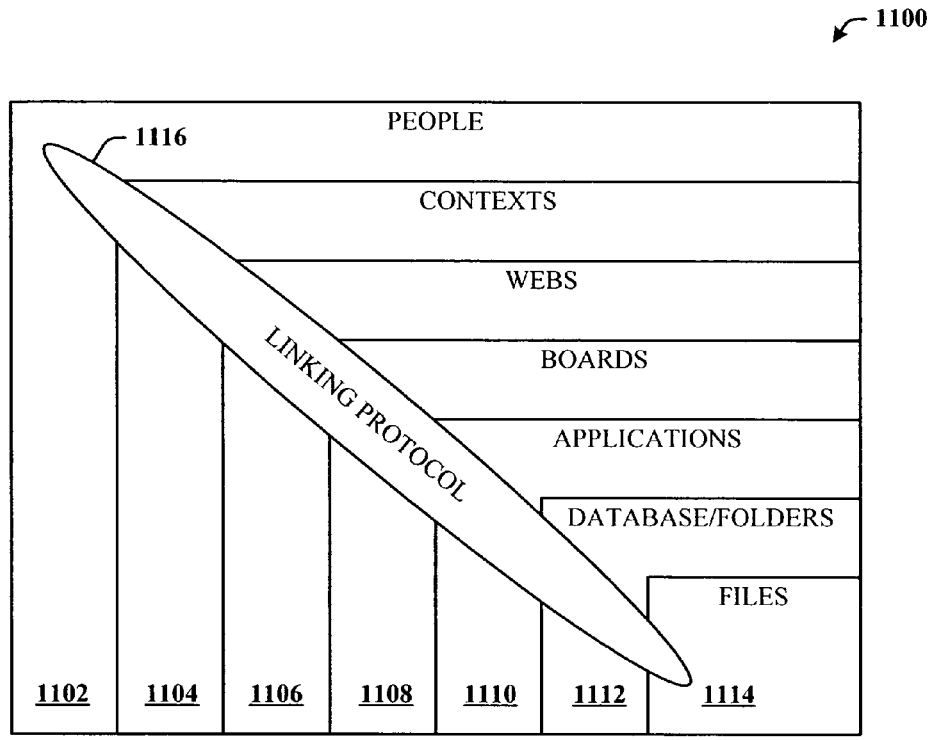
FIG. 11 illustrates a diagram of a general structure of the management tool system that employs the contextual tagging system of the present invention.

Referring now to FIG. 11, there is illustrated a diagram of a general structure of the management tool system 1100 that employs the contextual tagging system of the present invention. The structure starts at a high level with the user at a user level 1102. The user level 1102 is next associated with a context level 1104 that defines all contexts in which the user can be included. Under the context level 1104 is a web level 1106 that associates one or more of the webs with one or more of the contexts of the context level 1104. A boards level 1108 underlies the webs level 1106 and provides associations of the many boards with one or more of the webs. An applications level 1110 facilitates associating one or more applications with a board designated at the board level 1108. A database/folders level 1112 underlies the applications level 1110, and facilitates storing at least data, tables, and context information generated from the upper levels in folders, in the form of, e.g., files, at an associated underlying file level 1114. A linking protocol 1116 provides cross-level communication for facilitating all aspects of data processing and communication at all levels of the data management system 1100.

Figure 12:
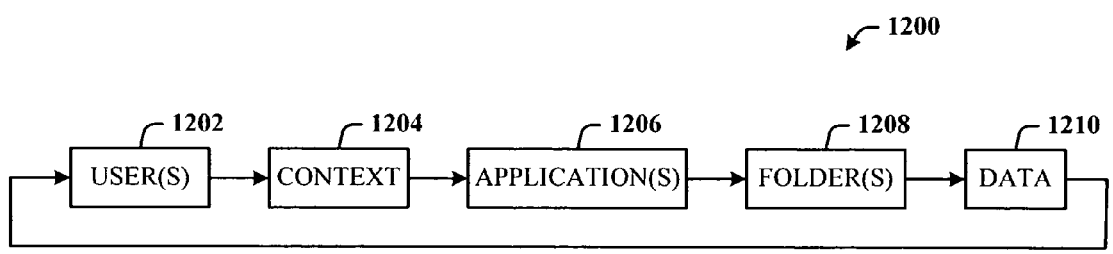
FIG. 12 illustrates a level flow diagram of the hierarchy of the present invention for associating one or more users, context, applications, and folders with data.

Referring now to FIG. 12, there is a level flow diagram 1200 illustrating the hierarchy of the present invention for associating one or more users 1202, context 1204, applications 1206, and folders 1208 with data 1210. The approach is for file storage pointers of an application to be dynamic, governed initially by the folder within which the application is launched. Additionally, the file storage pointers are then accessible and acted upon by the same application from any folder in the system. This is a dynamic non-linear implementation.

Traditional collaborative technologies, like groupware, allow groups of users to take action on the same file substantially simultaneously. However, in preparation for such capabilities, all users must have compatible versions of the same application that is to be used for working with the file. The context for any folder is limited to a one-to-many and many-to-one relationship. Essentially, the folder possesses a singular context to the directory tree in which it resides.

In contrast, the disclosed architecture assumes that the highest contextual level is that of an entity consisting of a group of users forming a many-to-many architecture. The users create and use the files within the context of the workspaces or boards of one or more users, which may or may not have web relationships. In this implementation, the board is similar in function to a folder in conventional LDAP systems.

The user then uses a suite of applications within a board, with any file created being immediately associated with the user, that board, any other board desired, and the application. In other words, by the person doing simply his/her work, an enormous amount of metadata about the context(s) for that work is captured automatically. Additionally, the system indexes the content to facilitate the other ways in which the users of the system might want to search on that file in the future—ways and future contexts which are not and cannot be known by the users in advance and certainly are not facilitated by conventional systems.

The system facilitates the use of an array of applications that act independently of the boards from which they were launched, and those boards are capable of being ordered in a myriad of collections of relationships (i.e., webs). The applications can traverse the webs to the boards associated with the information.

In addition to a macro view obtained by webs and boards, the user can also create familiar hierarchical folders within any board. These are virtual folders, in that their storage is governed by the process described above. No data is physically stored in these folders. Finally, any file or group of files can be associated with any other file in the system, allowing the users of the system infinite flexibility in determining dynamic associations among the macro/micro components of the system.

Figure 13:
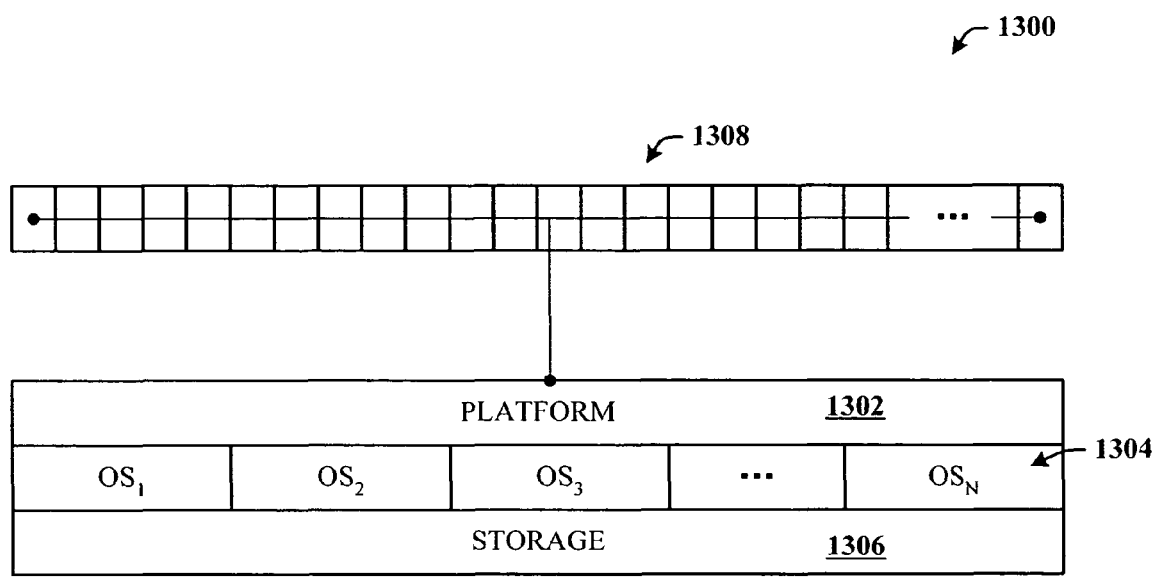
FIG. 13 illustrates a system operational in accordance with the contextual tagging system of the present invention.

Referring now to FIG. 13, there is illustrated a system 1300 operational in accordance with the contextual tagging system of the present invention. The system 1300 includes a data management platform 1302 suitable for accommodating any number conventional operating systems (OS) 1304 (also denoted $OS_1, OS_2, OS_3, \ldots, OS_N$). The system 1300 also facilitates the use of a single data storage system 1306 suitable for use with any of the operating systems 1304, whereas conventionally, a given OS may require a certain data storage file structure. The platform 1302 is OS-independent, and provides a single point of contact for multiple users and resources 1308.

Figure 14:
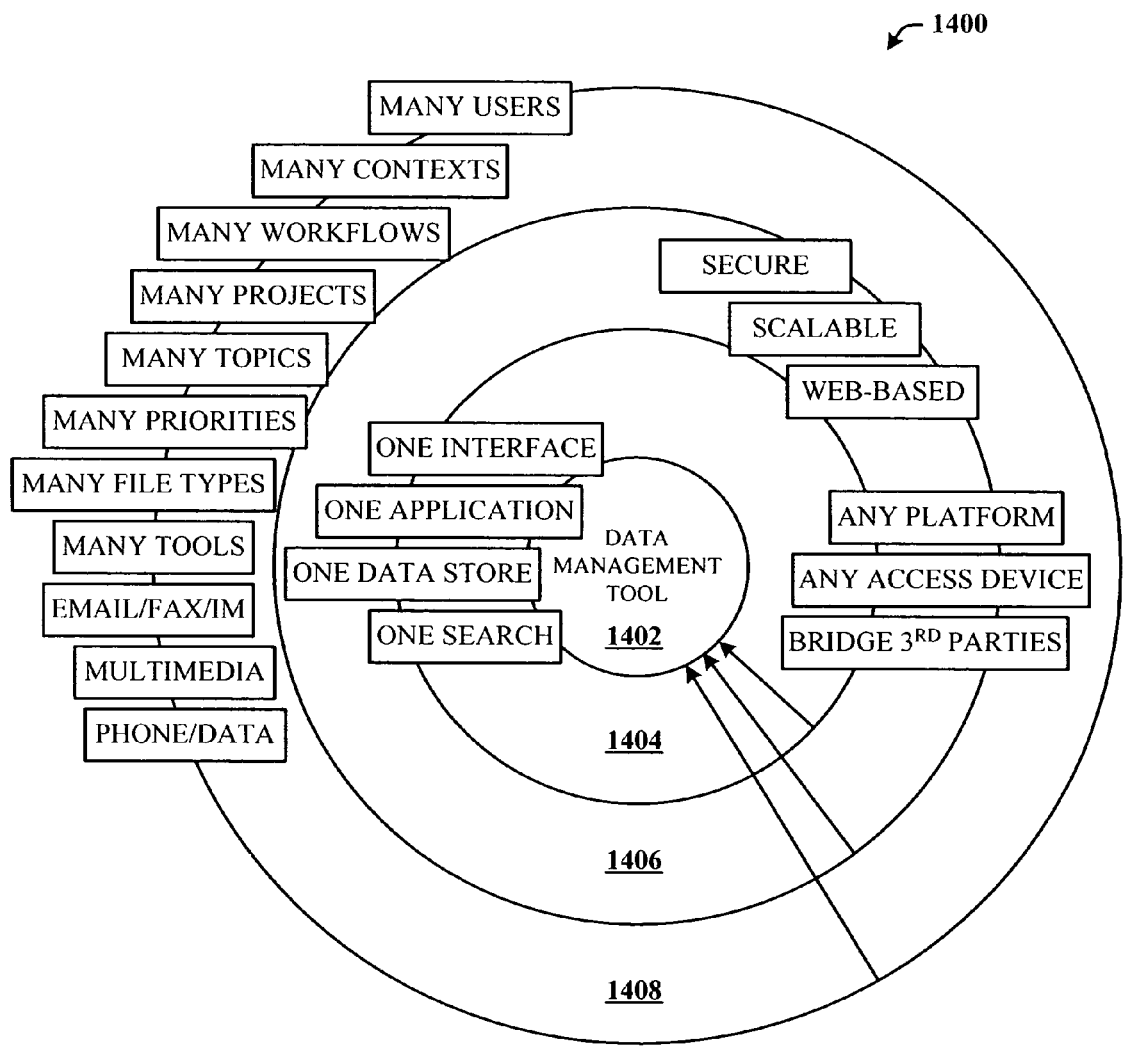
FIG. 14 illustrates a design integration chart of the disclosed invention.

Referring now to FIG. 14, there is illustrated a design integration chart 1400 of the data management tool. At the core of the system is a data management tool 1402 that facilitates all of the outlying features and capabilities. The tool 1402 facilitates, at a second layer 1404, one interface (via a browser), one application (the tool itself), one data store (associate with the management tool), and one search mechanism for finding any data element of the data store. Of course, any third party applications typically have their own search tool to search for files and folders that may also be used. At a third layer 1406, the system 1400 facilitates a secure operating environment, a scalable environment, and web-based. Moreover, the system 1400 can be implemented on any software and/or hardware platform, accommodate access from any device, and bridge to third party applications and devices. At an outer layer 1408, the system 1400 facilitates one or more instances of the following: users, contexts, workflows, projects, user-defined topics, priorities, file types, and tools. The system 1400 also is suitable for use with e-mail, facsimile, and instant messaging subsystems, multimedia services, and voice systems (e.g., phone and paging data).

The system 1400 captures and catalogs data automatically. Users, projects, permissions and communication tools can be readily configured, along with the exchange of voice information, data, and video data seamlessly. As users collaborate, the system 1400 captures context information, and automatically records when and how data is shared, who updated the data, how often the data was accessed, what additional information the data was linked to, etc. Meeting information can be stored automatically, including, but not limited to, who attended; the documents shared, instant messages captured, handouts used, slides presented, etc. A later search can retrieve this information along with the context(s) within which the data was generated and used.

The system 1400 enables larger numbers of users to organize communications around many projects substantially simultaneously. It can relate those projects to one another using whatever workflow model(s) are required, and dynamically assign modular communications tools (e.g., e-mail, voice mail, fax, teleconferencing, document sharing, etc.) to those many projects as desired. The system 1400 automatically indexes that information within the context(s) in which it is received and used. This way, when a user searches the system 1400 for information, the user not only gets the information sought, but also can see how the information is currently being used by other users and project groups in the whole system. Traditionally, if a document was to be associated with seven different projects, for example, the document would be stored in seven different file locations and version control could be a significant problem. In accordance with the present invention, the document is seamlessly linked to all seven projects. Thus, only one version exists, and version control is much easier to address.

The disclosed system architecture is suited to relational and object database structures for use on a large scale. The data management tool uses both relational and object storage approaches to facilitate at least Internet-based data communications.

Figure 15:
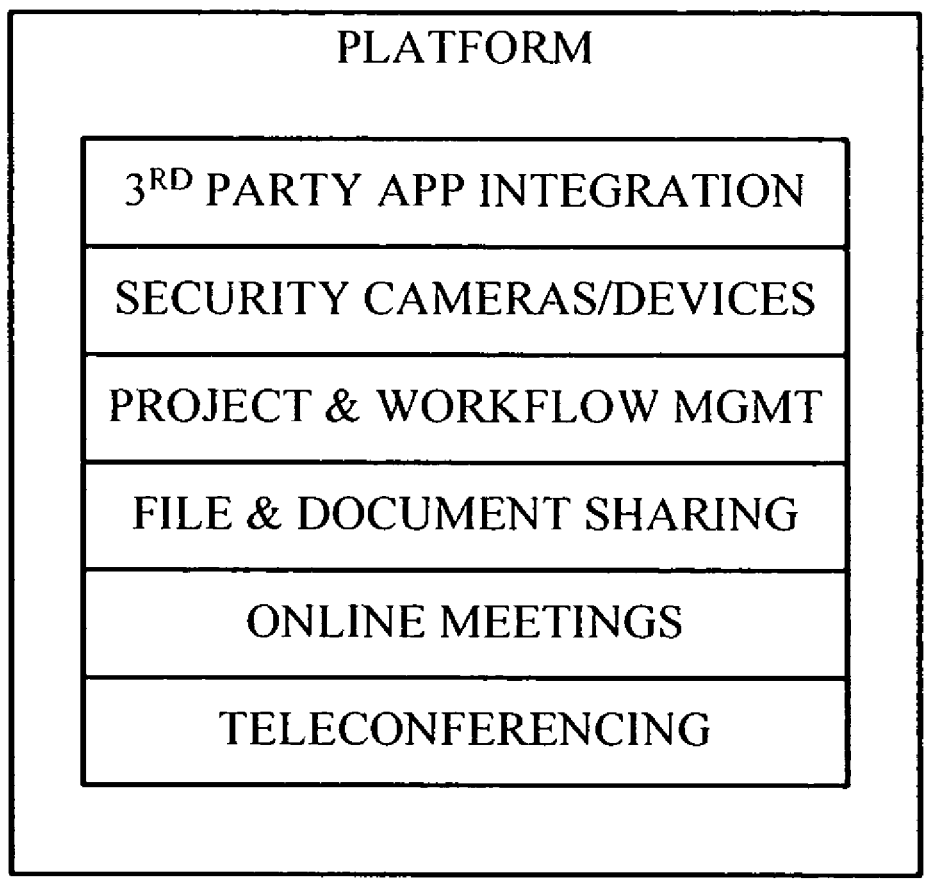
FIG. 15 illustrates one implementation of a platform system that employs the contextual tagging system of the present invention.

Referring now to FIG. 15, there is illustrated one implementation of a platform system 1500 that employs the contextual tagging system of the present invention. The platform system 1500 includes the capability of third-party application integration, security cameras and other devices for data input, project and workflow management and, file and document sharing. The platform system 1500 also accommodates online meetings between logged-in users, and teleconferencing between the users, if desired. The teleconferencing can be initiated using the platform system 1500.

Figure 16:
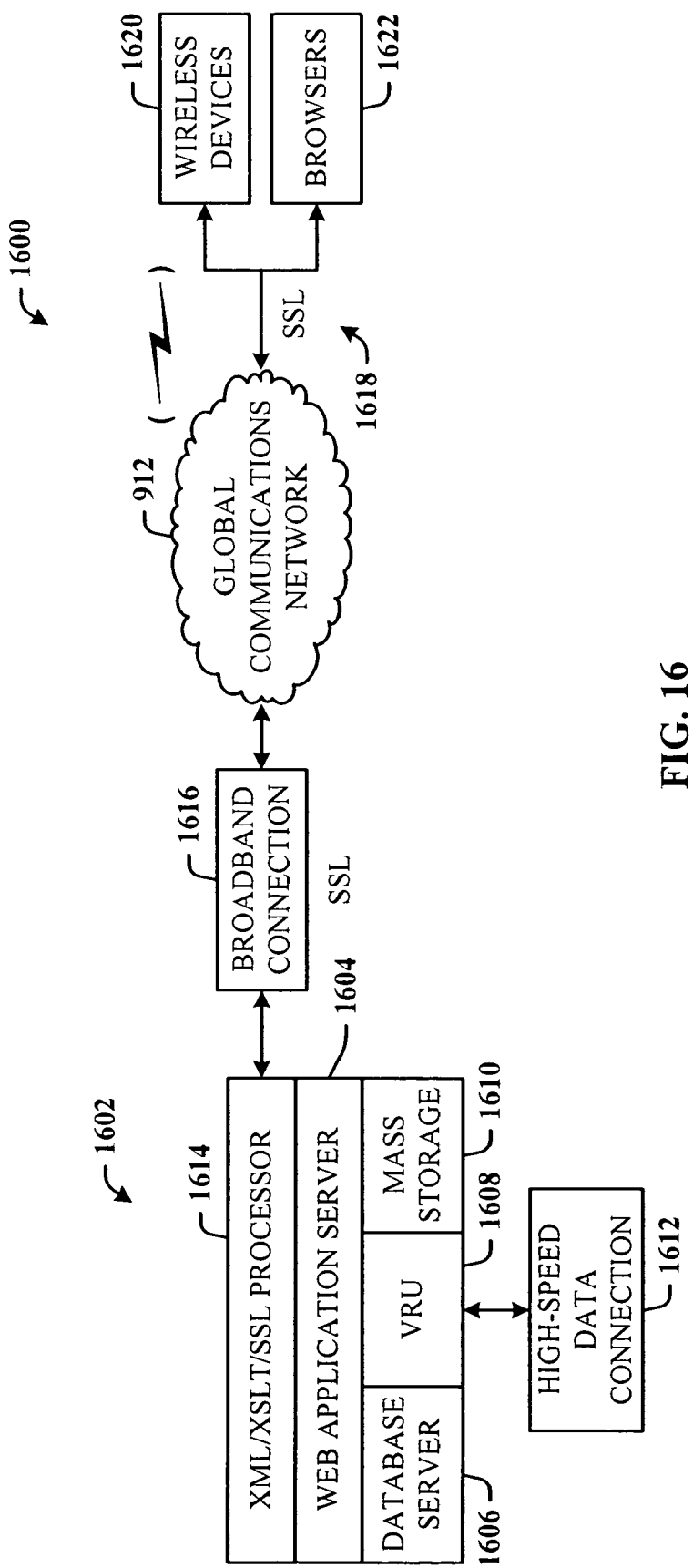
FIG. 16 illustrates a general system configuration of a system that employs the contextual tagging system of the present invention.

Referring now to FIG. 16, there is illustrated a general system configuration 1600 of a system that employs the contextual tagging system of the present invention. The system 1600 includes a platform 1602 that hosts at least the data management tool, here called a web application server 1604. The server 1604 provides a common layer to underlying services that include a database server 1606, a VRU (voice response unit) 1608 (also called an interactive VRU or IVRU) and mass storage system 1610. The VRU 1608 facilitates interactive calling features for a user via remote touchtone signals and to voice data to the caller such that the caller can make choices in response to predetermined options presented by the system.

The platform 1602 can utilize at least one multi-channel data communication connection 1612 (e.g., T1, DS3) into the VRU subsystem 1608 for communicating voice information and interacting with features of the platform 1602. As indicated previously, the invention can accommodate user communication from virtually any accessible network node. To facilitate such an interface, the platform 1602 can include a processor 1614 suitable for XML (eXtensible Markup Language), XSLT (XML Stylesheet Language: Transformations), and SSL processing. The processor 1614 can also access web-based services utilizing SOAP (Simple Object Access Protocol). SOAP employs XML syntax to send text commands across the network using HTTP (HyperText Transport Protocol). Thus, there is a high-speed connection 1616 (e.g., broadband) that interfaces to the processor layer 1614 for use with multiple communication exchanges with remote users disposed on the global communication network 912. The remote users can access the platform system 1602 via a SSL connection 1618 using portable wired/wireless devices 1620, and by way of the associated browsers 1622.

Figure 17:
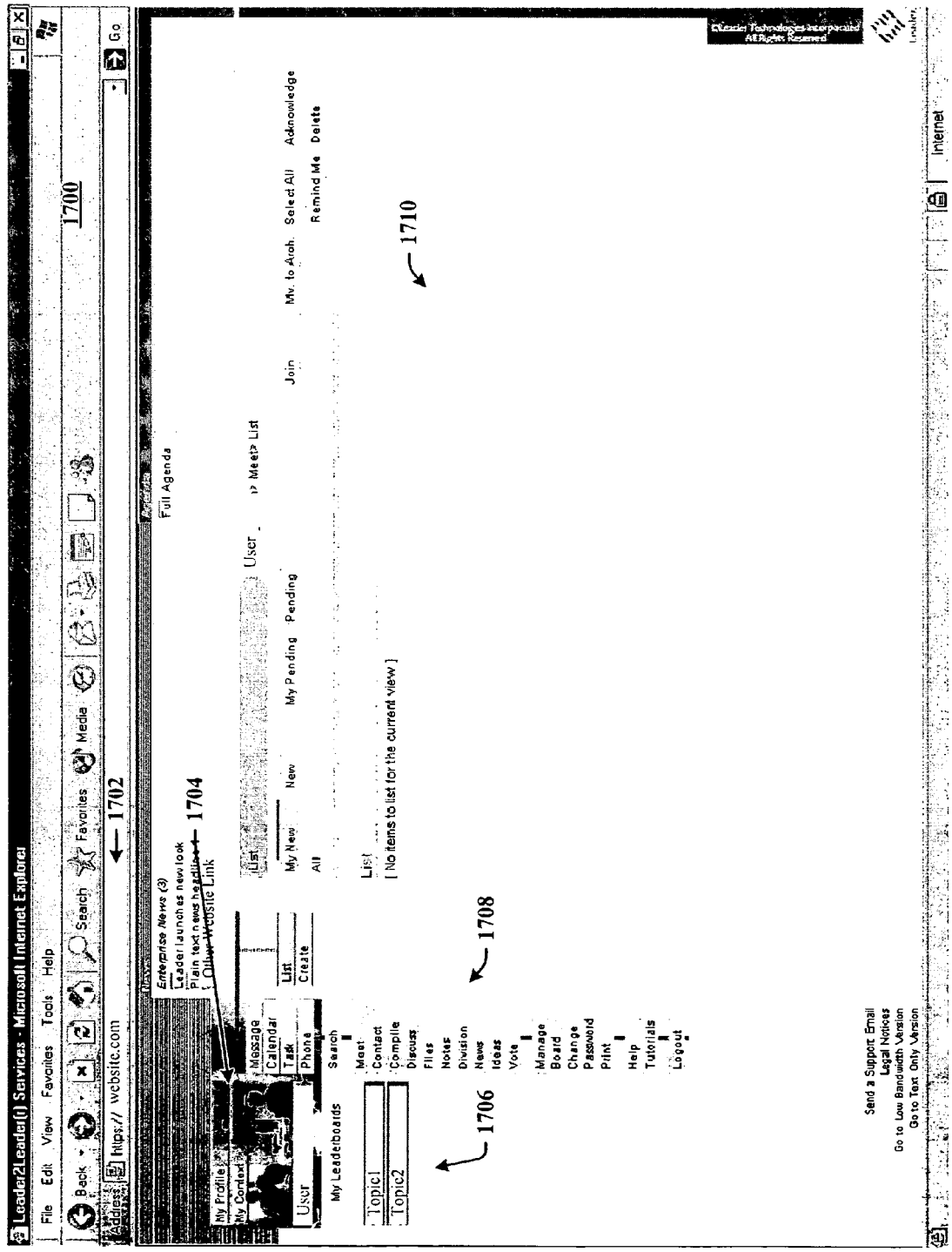
FIG. 17 illustrates a screenshot of a management tool window of a browser used as a user interface to facilitate user interaction with meeting information.

Referring now to FIG. 17, there is illustrated a screenshot of a management tool window 1700 of a browser (e.g., Internet Explorer by Microsoft Corporation) used as a user interface to facilitate user interaction with meeting information. The window 1700 includes an address field 1702 that indicates the default protocol and URL address for accessing the data management system of the present invention. Here, HTTP is used to access the server via network. The "https:" indicates the connection will be to a secure port instead of a default web port. The window 1700 also includes a user area 1704 that indicates the name of the user logged into the system. There is also provided a topic area 1706 that lists the various boards associated with the user-defined topics. Here, the user has defined two topics: a Topic 1 and a Topic 2.

The window 1700 also includes an application (or services) area 1708 that lists many applications selectable by the user while in this particulate window 1700. The applications presented to the user from this window 1700 include but are not limited to the following: Message, Calendar, Task, Phone, Search, Meet, Contact, Compile, Discuss, Files, Notes, Division, News, Ideas, Vote, Manage Board, Change, Password, Print, Help, Tutorial, and Logout. Depending on the user permissions provided by an administrator, the user may see more or fewer applications.

Here, the Meet application option is selected to allow user interaction with setting up a meeting related to projects of the user. The Meet application option further includes List and Create sub-options. When the List sub-option is selected, a center viewing area 1710 is used to present board, context, web address and other information so that the user can review the existing board and context information related to setting up a meeting. Selection the Create sub-option allows the user to create a meeting in associated with one or more of the boards and make changes to existing board relationships and contexts. Other user-selectable options are provided such that the user can Join in a session with one or more other users, Move data to Archive, Select all objects, set a Reminder for himself or herself, and Delete boards.

The Messaging option allows the user to give out an e-mail address of a project work area, enabling senders to send the messages to right place. Thus, the user no longer needs to manually move the messages to the appropriate folders once received in a personal message inbox. Additionally, incoming faxes are routed to the appropriate board for storage and review. Keywords and phrases in the fax are automatically indexed. Later retrieval is accommodated simply by performing a search for the keywords or phrases. Moreover, a given board can be assigned a fax number. Thus, all faxes coming in can be routed to that number, and on to the associated board.

The Vote option allows the company and organizations to communicate and gather opinions by way of voting. A question can be entered, and the users selected to whom the question(s) should be posed.

Figure 18:
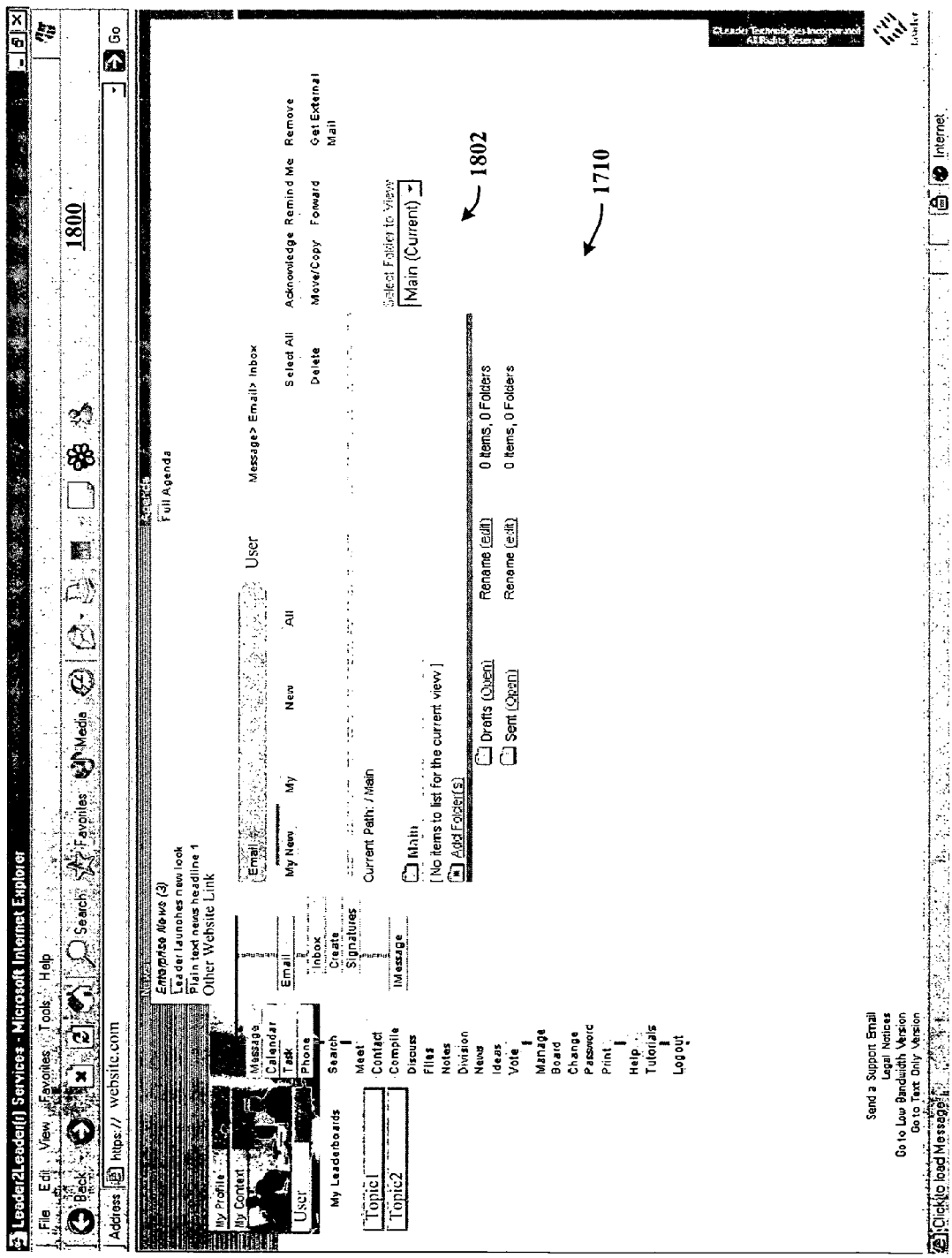
FIG. 18 illustrates a screenshot of a management tool window of a browser used as a user interface to facilitate user interaction with e-mail information.

Referring now to FIG. 18, there is illustrated a screenshot of a management tool window 1800 of a browser used as a user interface to facilitate user interaction with unified messaging, including e-mail, voice mail and fax information. The window 1800 includes many of the same fields and informational areas of the previous windows (e.g., areas 1702, 1704, 1706, and 1708 of window 1700 of FIG. 17). Here, the Message option is selected to allow user interaction with various forms of messaging support by the disclosed management architecture. The Message option further includes an instant messaging (IMessage) sub-option, in this particular implementation.

When the Email-Inbox sub-option is selected, the center viewing area 1710 is used to present the user's messaging inbox folders. The user can then open these folders to view the e-mail, voice mail and fax messages stored therein. The center viewing area 1710 also includes a drop-down menu 1802 that allows the user to select from a variety of different folders (e.g., Main, Drafts) of the e-mail system. The user can also create and sign messages with a digital signature.

As before, other user-selectable options are provided such that the user can manipulate messaging information, including, but not limited to, Select All, Delete, Acknowledge, Remind Me, Remove, Move/Copy, Forward, and Get External Mail.

There is also provided a News link that allows the user to link to the latest corporate and/or division news.

Figure 19:
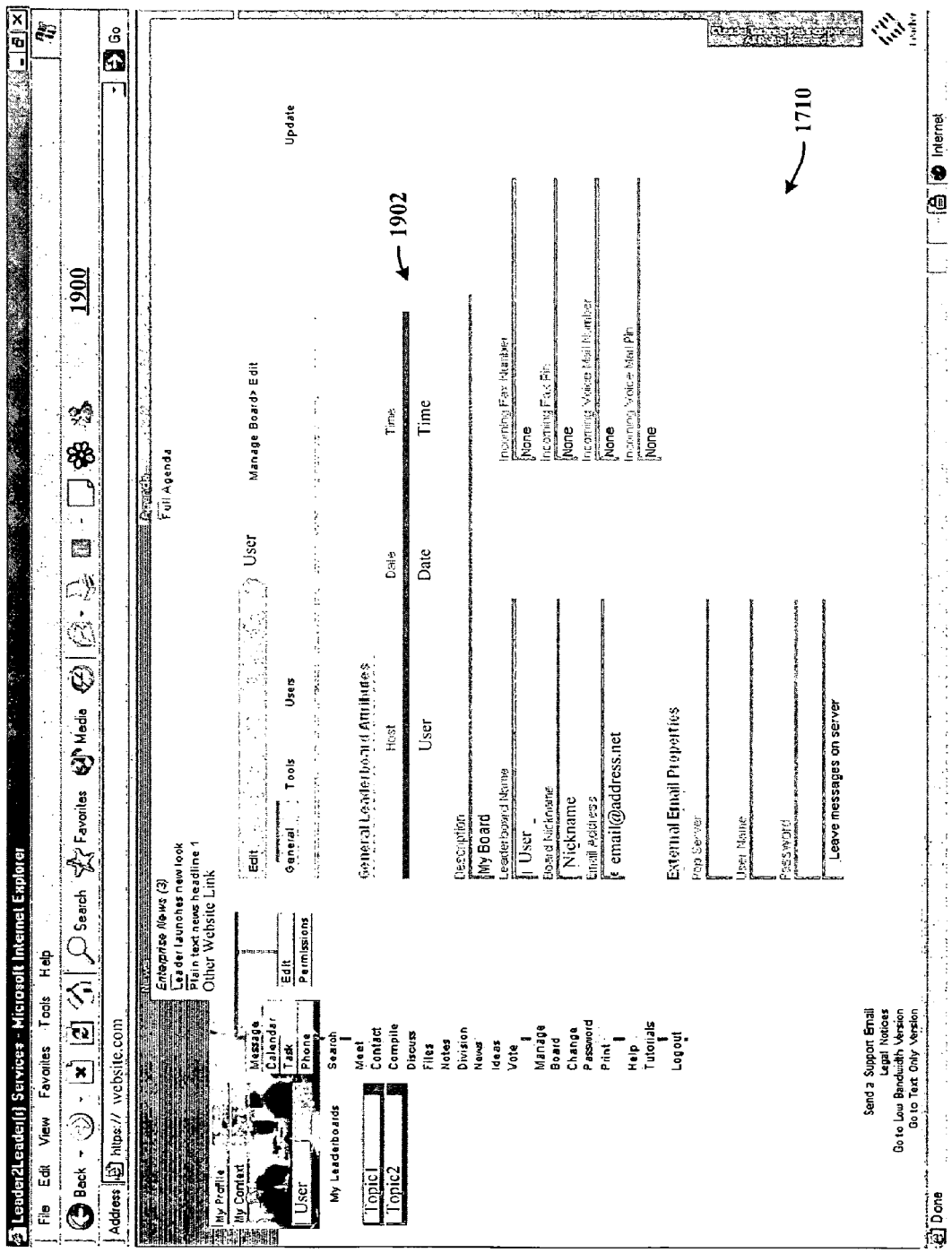
FIG. 19 illustrates a screenshot of a management tool window of a browser used as a user interface to facilitate user interaction with a board management option.

Referring now to FIG. 19, there is illustrated a screenshot of a management tool window 1900 of a browser used as a user interface to facilitate user interaction with a board management option. The window 1900 includes many of the same fields and informational areas of the previous windows (e.g., areas 1702, 1704, 1706, and 1708 of window 1700 of FIG. 17). Here, the Manage Board option is selected to allow user interaction with various forms of user management of boards. The associated sub-options allow the user to Edit the board attributes, and set permission levels thereto, in this particular implementation. Of course, many different additional or different options can be provided (in this window and other windows), at the discretion of the administrator. The system allows for new attributes to be added to this option as the need arises.

The center viewing area 1710 presents general board attributes 1902 of the user (e.g., user name, data, and time), and several fields for entering user information, including in this implementation, but not limited to, board description, board name, board nickname, board e-mail address, external e-mail properties (e.g., POP server, user name, and password), fax information (e.g., incoming fax number for the board and incoming fax PIN), and voice mail information (e.g., incoming voice mail number and incoming voice mail PIN).

Figure 20:
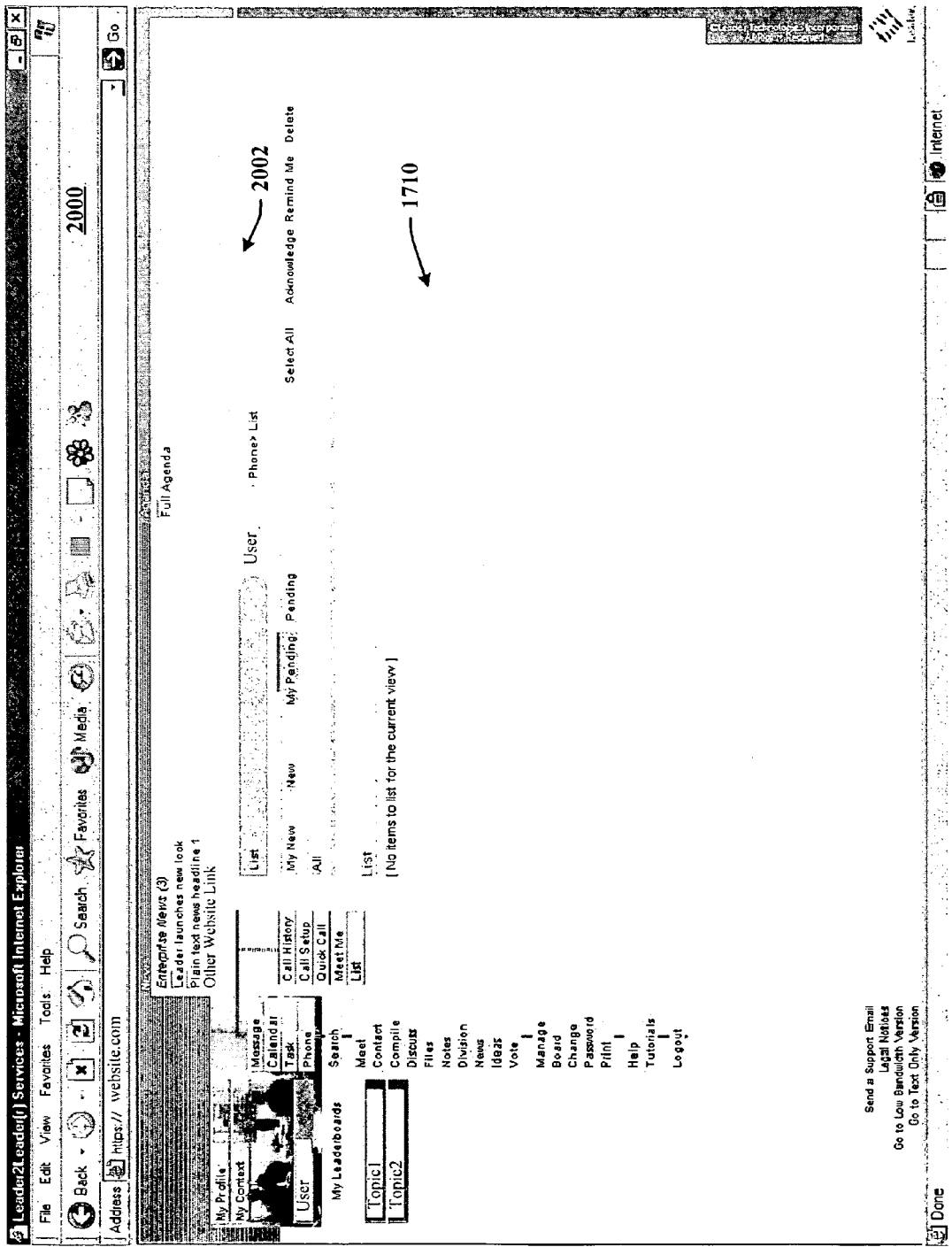
FIG. 20 illustrates a screenshot of a management tool window of a browser used as a user interface to facilitate user interaction with a phone option.

Referring now to FIG. 20, there is illustrated a screenshot of a management tool window 2000 of a browser used as a user interface to facilitate user interaction with a phone option. The window 2000 includes many of the same fields and informational areas of the previous windows (e.g., areas 1702, 1704, 1706, and 1708 of window 1700 of FIG. 17). The sub-options include Call History, Call Setup, Quick Call, Meet Me, and List. The central viewing area 1710 for this window 2000 simply includes a listing of phone-related events for the given user.

As before, other user-selectable options are provided such that the user can manipulate phone information, including, but not limited to, Select All, Delete, Acknowledge, and Remind Me. In addition, as with the other windows, there is included an Agenda area 2002 for presenting any agenda information of a meeting or upcoming event.

Figure 21:
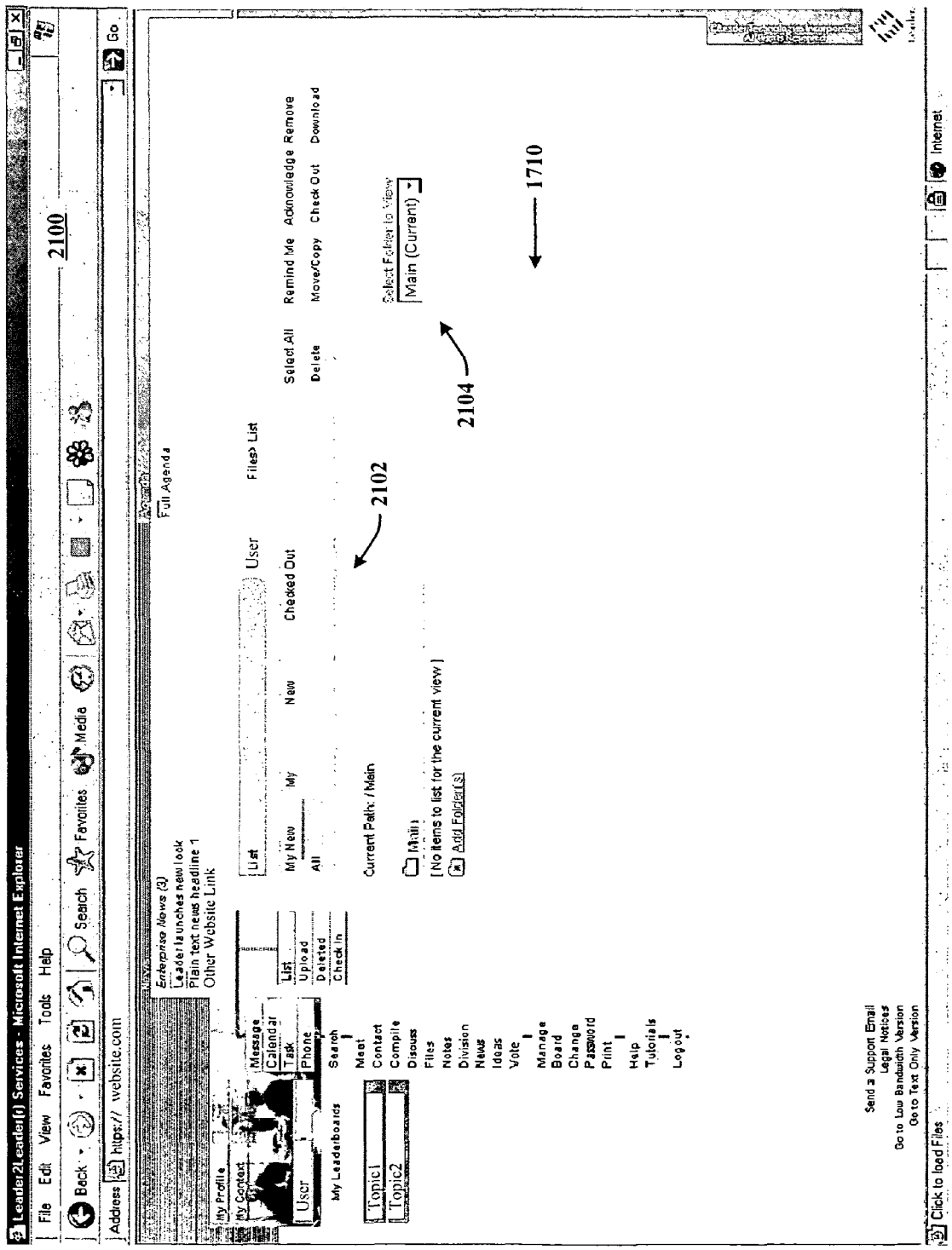
FIG. 21 illustrates a screenshot of a management tool window of a browser used as a user interface to facilitate user interaction with a files option.

Referring now to FIG. 21, there is illustrated a screenshot of a management tool window 2100 of a browser used as a user interface to facilitate user interaction with a files option. The window 2100 includes many of the same fields and informational areas of the previous windows (e.g., areas 1702, 1704, 1706, and 1708 of window 1700 of FIG. 17).

Here, the sub-options include List, Upload, Deleted, and Check In. Thus, data can at least be listed, uploaded to the system and/or a board, deleted from, the system and/or board, and checked in from a previous checkout process.

The window 2100 includes the central viewing area 1710 for viewing information requested or selected for presentation. There is also a user control area 2102 that facilitates listing user documents that are checked out of the system or board. There is also provided a dropdown menu 2104 for selecting from a number of folder viewing options.

Other user-selectable options are provided such that the user can manipulate documents, including, but not limited to, Select All, Delete, Acknowledge, Remind Me, Remove, Move/Copy, Check Out and Download.

Figure 22:
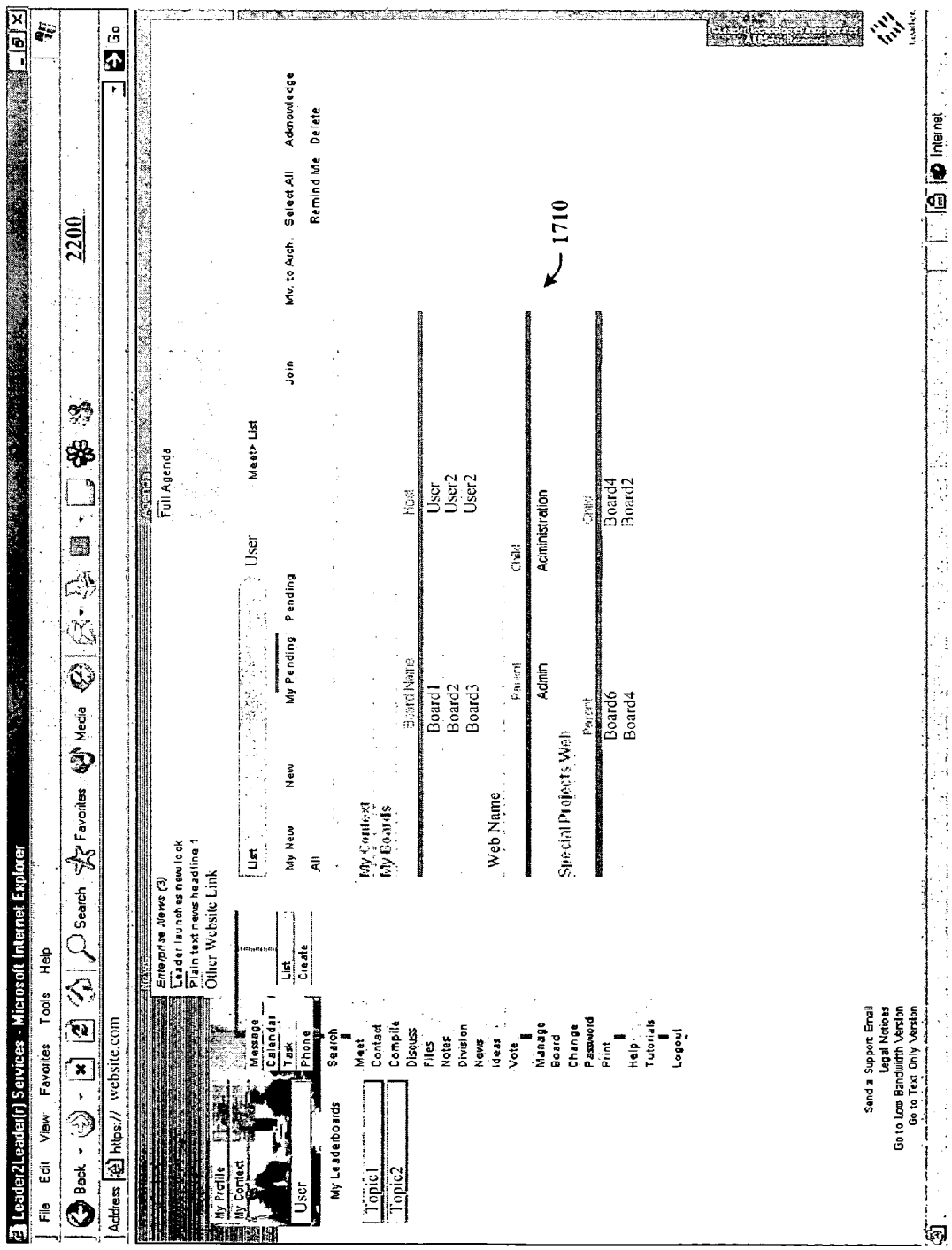
FIG. 22 illustrates a screenshot of a management too window of a browser used as a user interface to facilitate user interaction with a user context.

Referring now to FIG. 22, there is illustrated a screenshot of a management tool window of a browser used as a user interface to facilitate user interaction with a user context. Here, the My Context option was selected while in the Meet application option. Thus, the context information of the user is posted within the meeting space. The window 2200 includes many of the same fields and informational areas of the previous windows (e.g., areas 1702, 1704, 1706, and 1708 of window 1700 of FIG. 17). Here, the sub-options associated with Meet include List and Create. Thus, data can at least be listed and created in accordance with the associated need. Note that other data can also be accessed and presented within an application option, for example, My Profile will show the user profile data.

The window 2200 includes the central viewing area 1710 for viewing information requested or selected for presentation. Here, the user has selected the presentation of the user context information, which also includes board information and relationships. For example, board names Board1, Board2, and Board3 are listed, along with the hosts, User (the current user) for Board1, and User2 for both boards Board2 and Board3. The web name is also listed for the collection of these three boards.

There is a Special Projects Web listed, and the associated parent/child relationships of the associated boards. For example, Board6 is a parent to Board4, and Board4 is also a parent to Board2.

Other user-selectable options are provided for the Meet option, such as Join, Move to Archive, Select All, Delete, Acknowledge, and Remind Me.

These are but only a few of the numerous windows employed to facilitate user interaction, input, and control of the management tool system. Many other windows are provided to support, for example, printing, user help, communications security, presenting user documents to other users, metering user performance, dialog and discovery forums, calendar functions, task functions, leadership tools, file system management, user context, telephone services, e-mail, voicemail, faxes, video conferencing, web conferencing, security video, reverse 911, voice broadcasting, first response unified messaging capabilities, specialized APIs, software development kit, conduct and store meetings, organizing personal contact information, enterprise webs, chat sessions, intellectual notes and ideas, workflows, compilations, user profiles, news, searching, user alerts, integration of third-party users and resources, multimedia information, user permissions, system configuration, and wireless portable device interfaces, just to name a few.

Figure 23:
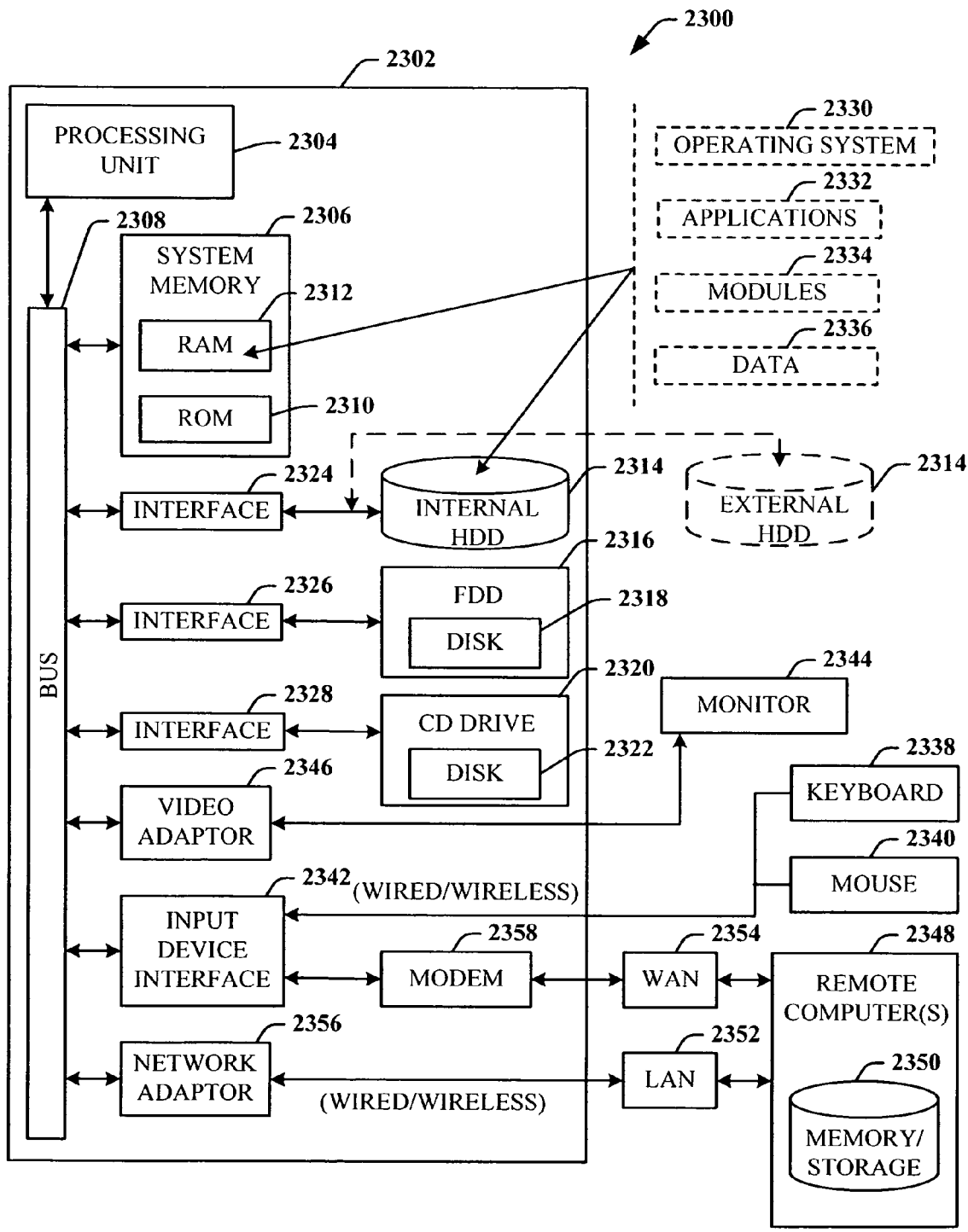
FIG. 23 illustrates a block diagram of a computer operable to execute the disclosed contextual tagging architecture.

Referring now to FIG. 23, there is illustrated a block diagram of a computer operable to execute the disclosed contextual tagging architecture. In order to provide additional context for various aspects of the present invention, FIG. 23 and the following discussion are intended to provide a brief, general description of a suitable computing environment 2300 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices.

The illustrated aspects of the invention may also be practiced in distributed computing environments where certain tasks are performed by remote processing devices that are linked through a communications network. In a distributed computing environment, program modules may be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 23, there is illustrated an exemplary environment 2300 for implementing various aspects of the invention that includes a computer 2302, the computer 2302 including a processing unit 2304, a system memory 2306 and a system bus 2308. The system bus 2308 couples system components including, but not limited to, the system memory 2306 to the processing unit 2304. The processing unit 2304 may be any of various commercially available processors. Dual microprocessors and other multi-processor architectures may also be employed as the processing unit 2304.

The system bus 2308 can be any of several types of bus structure that may further interconnect to a memory bus (with or without a memory controller), a peripheral bus, and a local bus using any of a variety of commercially available bus architectures. The system memory 2306 includes read only memory (ROM) 2310 and random access memory (RAM) 2312. A basic input/output system (BIOS) is stored in a non-volatile memory 2310 such as ROM, EPROM, EEPROM, which BIOS contains the basic routines that help to transfer information between elements within the computer 2302, such as during start-up. The RAM 2312 can also include a high-speed RAM such as static RAM for caching data.

The computer 2302 further includes an internal hard disk drive (HDD) 2314 (e.g., EIDE, SATA), which internal hard disk drive 2314 may also be configured for external use in a suitable chassis (not shown), a magnetic floppy disk drive (FDD) 2316, (e.g., to read from or write to a removable diskette 2318) and an optical disk drive 2320, (e.g., reading a CD-ROM disk 2322 or, to read from or write to other high capacity optical media such as the DVD). The hard disk drive 2314, magnetic disk drive 2316 and optical disk drive 2320 can be connected to the system bus 2308 by a hard disk drive interface 2324, a magnetic disk drive interface 2326 and an optical drive interface 2328, respectively. The interface 2324 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 2302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 2312, including an operating system 2330, one or more application programs 2332, other program modules 2334 and program data 2336. All or portions of the operating system, applications, modules, and/or data can also be cached in the RAM 2312.

It is appreciated that the present invention can be implemented with various commercially available operating systems or combinations of operating systems.

A user can enter commands and information into the computer 2302 through one or more wired/wireless input devices, e.g., a keyboard 2338 and a pointing device, such as a mouse 2340. Other input devices (not shown) may include a microphone, an IR remote control, a joystick, a game pad, a stylus pen, touch screen, or the like. These and other input devices are often connected to the processing unit 2304 through an input device interface 2342 that is coupled to the system bus 2308, but may be connected by other interfaces, such as a parallel port, an IEEE 1394 serial port, a game port, a USB port, an IR interface, etc.

A monitor 2344 or other type of display device is also connected to the system bus 2308 via an interface, such as a video adapter 2346. In addition to the monitor 2344, a computer typically includes other peripheral output devices (not shown), such as speakers, printers, etc.

The computer 2302 may operate in a networked environment using logical connections via wired and/or wireless communications to one or more remote computers, such as a remote computer(s) 2348. The remote computer(s) 2348 may be a workstation, a server computer, a router, a personal computer, portable computer, microprocessor-based entertainment appliance, a peer device or other common network node, and typically includes many or all of the elements described relative to the computer 2302, although, for purposes of brevity, only a memory storage device 2350 is illustrated. The logical connections depicted include wired/wireless connectivity to a local area network (LAN) 2352 and/or larger networks, e.g., a wide area network (WAN) 2354. Such LAN and WAN networking environments are commonplace in offices, and companies, and facilitate enterprise-wide computer networks, such as intranets, all of which may connect to a global communication network, e.g., the Internet.

When used in a LAN networking environment, the computer 2302 is connected to the local network 2352 through a wired and/or wireless communication network interface or adapter 2356. The adaptor 2356 may facilitate wired or wireless communication to the LAN 2352, which may also include a wireless access point disposed thereon for communicating with the wireless adaptor 2356. When used in a WAN networking environment, the computer 2302 can include a modem 2358, or is connected to a communications server on the LAN, or has other means for establishing communications over the WAN 2354, such as by way of the Internet. The modem 2358, which may be internal or external and a wired or wireless device, is connected to the system bus 2308 via the serial port interface 2342. In a networked environment, program modules depicted relative to the computer 2302, or portions thereof, may be stored in the remote memory/storage device 2350. It will be appreciated that the network connections shown are exemplary and other means of establishing a communications link between the computers may be used.

The computer 2302 is operable to communicate with any wireless devices or entities operably disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out, and anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11a) or 54 Mbps (802.11b) data rate or with products that contain both bands (dual band), so the networks can provide real-world performance similar to the basic 10BaseT wired Ethernet networks used in many offices.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates the association of data with a user, a first context associated with a first plurality of users and a second context associated with a second plurality of users, comprising:
   a storage device adapted to store data and contextual metadata, the contextual metadata being associated with:
   a) the user;
   b) a data component that is associated with one or more data operations being performed on the data; and
   c) a tagging component that automatically tags contextual information as the contextual metadata when the data is created, the contextual information being at least one of automatically generated information generated by the system upon creation of the data and automatically generated information generated by the system upon the one or more data operations being performed on the data; and
   a computer device linked via one or more communication links to the storage device, the computer device adapted to execute a software tool configured to perform the steps of:
   automatically tagging contextual information related to the user, the software tool, and the first context to the data as contextual metadata upon one or more data operations being performed on the data while in the first context to which the software tool is associated;
   automatically generating a plurality of pointers to the data for the first plurality of users as part of the contextual information upon entry of the data into the first context, each pointer linking one of the first plurality of users associated with the first context to the data;
   updating the contextual metadata based upon the one or more data operations;
   automatically tagging contextual information related to the user, the software tool, and the second context to the data as contextual metadata upon one or more data operations being performed on the data while in the second context to which the software tool is associated;
   automatically generating a plurality of pointers to the data for the second plurality of users as part of the contextual information upon entry of the data into the second context, each pointer linking one of the second plurality of users associated with the second context to the data;
   updating the contextual metadata based upon the one or more data operations.

2. The system of claim 1, the contextual information is tagged to the data when the data is being saved.

3. The system of claim 1, the contextual information is tagged to the data when the data is first saved.

4. The system of claim 1, wherein the contextual information is representative of at least one of the first context and the second context that is associated with a board.

5. The system of claim 1; wherein the contextual information is automatically tagged to any type, of data created in association with at least one of the first context and the second context.

6. The system of claim 1, wherein each of the plurality of pointers for the first and second plurality of users provides a link to a single storage location of the data.

7. The system of claim 1, wherein each of the plurality of pointers for the first and second plurality of users provides a link to a storage location of the data, and wherein upon designation of a third context by the user, a plurality of pointers to the data is automatically generated for the users associated with the third context, each pointer linking one of the users associated with the third context to the data.

8. The system of claim 1, wherein the contextual information is associated with at least one of the first context and the second context, wherein at least one of the first context and the second context is further associated with an application tool that is used to generate the data.

9. The system of claim 8, wherein the application tool is associated with at least one of the first context and the second context, and contains the ability to associate the user with the data created by the application tool.

10. The system of claim 9, the application tool points to a storage location of the data.

11. The system of claim 1, wherein the data component includes one or more applications that perform data operations related to at least one of telephony, unified messaging, decision support, document management, portals, chat, collaboration, search, vote, relationship management, calendar, personal information, management, profiling, video, directory management, executive information systems, dashboards, cockpits, tasking, meeting and, web and video conferencing.

12. The system of claim 1, wherein the contextual information includes context data that is representative of at least one of the first context and the second context, which context data is automatically tagged to the data.

13. The system of claim 1, wherein the first context is at least one of a first web page, a first environment, a first workspace, a first portal, a first profile, a first board, a first Uniform Resource Locator and a first link.

14. The system of claim 1, wherein the second context is at least one of a second web page, a second environment, a second workspace, a second portal, a second profile, a second board, a second Uniform Resource Locator and a second link.

15. A system that facilitates the association of data with a user and a first board context, comprising:
   a storage device adapted to store data and contextual metadata, the contextual metadata being associated with:
   a) the user;
   b) a data component that is associated with one or more data operations performed on the data in the first board context of the user; and
   c) a tagging component that automatically tags contextual information of the user as the contextual metadata when the data is first saved, the contextual information being at least one of automatically generated information generated by the system upon creation of the data and automatically generated information generated by the system upon the one or more data operations being performed on the data; and
   a computer device linked via one or more communication links to the storage device, the computer device adapted to execute a software tool configured to perform the steps of:

automatically tagging contextual information related to the user, the software tool, and the first board context to the data as contextual metadata upon one or more data operations being performed on the data while in the first board context to which the software tool is associated; and automatically generating a first plurality of pointers to the data as part of the contextual information upon entry of the data into the first board context, a pointer for each user associated with the first board context providing a link to the data for that user associated with the first board context;

automatically tagging contextual information related to the user, the software tool, and a second board context to the data as contextual metadata upon one or more data operations being performed on the data while in the second board context to which the software tool is associated; and automatically generating a second plurality of pointers to the data as part of the contextual information upon entry of the data into the second board context, a pointer for each user associated with the second board context providing a link to the data for that user associated with the second board context;

updating the contextual metadata based upon the one or more data operations;

wherein the first board context is part of a web context that includes a plurality of board contexts; and wherein the contextual metadata is updated based on the one or more data operations occurring in any one of the plurality of board contexts in the web context.

16. The system of claim 15, wherein each of the first plurality of pointers provides a link to a single storage location of the data.

17. The system of claim 15, wherein each of the first plurality of pointers provides a link to a single storage location of the data, which link is assigned to each user of the board context in which the data was created.

18. The system of claim 15, wherein the contextual information is associated with a board context that is further associated with an application tool that generates the data, the application tool generates a pointer to the data for each board context to which it is associated.

19. The system of claim 18, wherein the pointers generated by the application tool point to the only storage location of the data.

20. The system of claim 18, wherein the pointers generated by the application tool are generated with a read-only access.

21. The system of claim 15, the one or more data operations cause updating of at least one of the contextual information and the data.

22. The system of claim 15, the contextual information includes at least one of web ID, a board ID, a transversal to the location of the data, and parameters representative of the one or more data operations that can be performed on the data.

23. A computer-implemented method that facilitates associating data with a user and a first context associated with a first plurality of users and a second context associated with a second plurality of users, the method comprising:

initiating a session on a computer system for an individual user in the first context, wherein the first context is a digital workspace of at least one of events, subjects, relationships and resources associated with the individual user;

automatically tagging contextual information related to the individual user and the first context to the data, the contextual information being at least one of information related to the first context generated automatically upon creation of the data and information related to the first context generated automatically upon one or more data operations being performed on the data while in the first context;

automatically generating a plurality of pointers to the data for the first plurality of users upon entry of the data into the first context, each pointer providing a link to the data for one of the first plurality of users associated with the first context;

updating the contextual information based upon the one or more data operations;

initiating a session on a computer system for the individual user in the second context, wherein the second context is a digital workspace of at least one of events, subjects, relationships and resources associated with the individual user;

automatically tagging contextual information related to the individual user and the second context to the data, the contextual information being at least one of information related to the second context generated automatically upon creation of the data and information related to the second context generated automatically upon one or more data operations being performed on the data while in the second context;

automatically generating a plurality of pointers to the data for the second plurality of users upon entry of the data into the second context, each pointer providing a link to the data for one of the second plurality of users associated with the second context; and updating the contextual information based upon the one or more data operations.

24. The method of claim 23, further comprising tagging the contextual information to the data when the data is first being saved.

25. The method of claim 23, the contextual information is updated when the data is saved.

26. The method of claim 23, further comprising tagging the contextual information to the data in accordance with a backup operation.

27. The method of claim 23, further comprising associating one or more users of at least one of the first context and the second context to the data using the contextual information.

28. The method of claim 27, the one or more users are granted at least read access to the data.

29. The method of claim 23, further comprising encoding the location of the stored data such that the encoded location is processed to access the stored data.

30. The method of claim 23, wherein the first context is at least one of a first web page, a first workspace, a first portal, a first environment, a first profile, a first board, a first Uniform Resource Locator and a first link.

31. The method of claim 23, wherein the second context is at least one of a second web page, a second environment, a second workspace, a second portal, a second profile, a second board, a second Uniform Resource Locator and a second link.

32. A system that facilitates the association of data with a first context and a second context in a many-to-many data regime, comprising:

computer-implemented means for initiating a session on a computer system for a user in the first context and the second context, wherein the first context and the second context are each a digital workspace of at least one of events, subjects, relationships and resources associated with the user;

computer-implemented means for automatically tagging to the data contextual information related to the first context, the contextual information being at least one of information related to the first context generated automatically upon creation of the data and information related to the first context generated automatically upon one or more data operations being performed on the data while in the first context;

computer-implemented means for automatically tagging to the data contextual information related to the second context, the contextual information being at least one of information related to the second context generated automatically upon creation of the data and information related to the second context generated automatically upon one or more data operations being performed on the data while in the second context;

computer-implemented means for updating the contextual information based upon the one or more data operations;

computer-implemented means for automatically linking the user, and all other users associated with the first context, with the location of the data upon entry of the data in the first context; and computer-implemented means for automatically linking the user, and all other users associated with the second context, with the location of the data upon entry of the data in the second context.

33. A system that tags user-defined data with metadata comprising:
   a storage device that stores the user-defined data and the metadata, the metadata including information about:
   a) the user,
   b) a software application that creates data based upon one or more received data operations;
   c) a tagging component that automatically tags the user-defined data with at least one of metadata related to the user, the software application and a web page associated with the software application upon one or more data operations being performed on the user-defined data; and
   a computer device linked by one or more communication links to the storage device, the computer device adapted to execute a software program configured to perform the steps of:
      creating a first instance of user-defined data in a first web page to which the software application is associated;
      automatically tagging the first instance of user-defined data with the metadata relating to the user, the software application and the first web page;
      automatically creating a pointer for each user associated with the first web page upon entry of the first instance of user-defined data in the first web page, each pointer linking a user associated with the first web page to the first instance of user-defined data;
      updating the metadata based, at least in part, on the software application receiving the one or more of the data operations in the first web page;
      creating a second instance of user-defined data in a second web page to which the software application is associated;
      automatically tagging the second instance of user-defined data with the metadata relating to the user, the software application and the second web page;
      automatically creating a pointer for each user associated with the second web page upon entry of the second instance of user-defined data in the second web page, each pointer linking a user associated with the second web page to the second instance of user-defined data; and
      updating the metadata based, at least in part, on the software application receiving one or more of the data operations in the second web page.

34. A system that facilitates the association of data with a user, a first context and a second context, comprising:
   a storage device adapted to store data and contextual metadata, the contextual metadata being associated with:
   a) the user;
   b) the first context;
   c) the second context;
   d) a data component that is associated with one or more data operations being performed on the data; and
   e) a tagging component that automatically tags contextual information associated with at least one of the first context and the second context as the contextual metadata when the data is created and/or one or more data operations are performed on the data; and
   a computer device linked via one or more communication links to the storage device, the computer device adapted to execute a software tool configured to:
      automatically tag contextual information related to the user, the software tool, and the first context to the data as contextual metadata upon one or more data operations being performed on the data while in the first context to which the software tool is associated;
      automatically generate a pointer to the data for each of a plurality of users having access to the first context upon entry of the data into the first context, each pointer providing a link to the data for one of the plurality of users having access to the first context;
      update the contextual metadata based upon the one or more data operations performed on the data in the first context;
      automatically tag contextual information related to the user, the software tool, and the second context to the data as contextual metadata upon one or more data operations being performed on the data while in the second context to which the software tool is associated;
      automatically generate a pointer to the data for each of a plurality of users having access to the second context upon entry of the data into the second context, each pointer providing a link to the data for one of the plurality of users having access to the second context; and
      update the contextual metadata based upon the one or more data operations performed on the data in the second context.

35. The system of claim 34,
   wherein the first context is at least one of a first web page, a first workspace, a first portal, a first environment, a first profile, a first board, a first Uniform Resource Locator and a first link; and
   wherein the second context is at least one of a second web page, a second environment, a second workspace, a second portal, a second profile, a second board, a second Uniform Resource Locator and a second link.

* * * * *